(12) United States Patent
Hendrickson et al.

(10) Patent No.: US 8,535,411 B2
(45) Date of Patent: Sep. 17, 2013

(54) PRODUCTION OF IRON FROM METALLURGICAL WASTE

(75) Inventors: David W. Hendrickson, Colraine, MN (US); Iwao Iwasaki, Tokyo (JP)

(73) Assignee: Nu-Iron Technology, LLC, Charlotte, NC (US)

( * ) Notice: Subject to any disclaimer, the term of this patent is extended or adjusted under 35 U.S.C. 154(b) by 0 days.

(21) Appl. No.: 13/187,937

(22) Filed: Jul. 21, 2011

(65) Prior Publication Data

US 2011/0308353 A1    Dec. 22, 2011

Related U.S. Application Data

(63) Continuation of application No. PCT/US2010/021790, filed on Jan. 22, 2010.

(60) Provisional application No. 61/146,455, filed on Jan. 22, 2009.

(51) Int. Cl.
    C21B 13/10   (2006.01)
    C22B 7/00    (2006.01)
    C22B 7/02    (2006.01)
    C22B 1/14    (2006.01)

(52) U.S. Cl.
    USPC ............................................. 75/485; 75/770

(58) Field of Classification Search
    USPC .................................................. 75/770, 485
    See application file for complete search history.

(56) References Cited

U.S. PATENT DOCUMENTS

| 5,779,877 A | 7/1998 | Drinkard, Jr. et al. |
| 5,897,685 A | 4/1999 | Goozner et al. |
| 5,912,402 A | 6/1999 | Drinkard, Jr. et al. |

(Continued)

FOREIGN PATENT DOCUMENTS

| JP | 09-143578 | 6/1997 |
| JP | 11-229046 | 8/1999 |
| JP | 2004-292837 | 10/2004 |
| JP | 2005-264310 | 9/2005 |

OTHER PUBLICATIONS

"Grit and Microgrit Grading Conversion Chart" from Reade Advanced Materials, 1997. Downloaded from http://www.reade.com/Sieve/grit_conversion.html on Aug. 6, 2012.*
JP11-229046 English Machine Translation, Published Aug. 1999.

(Continued)

*Primary Examiner* — George Wyszomierski
*Assistant Examiner* — Tima M McGuthry Banks
(74) *Attorney, Agent, or Firm* — Hahn, Loeser & Parks LLP; Arland T. Stein

(57) ABSTRACT

A method of recovering metallic iron from iron-bearing metallurgical waste in steelmaking comprising steps of providing an iron-bearing metallurgical waste containing more than 55% by weight FeO and FeO equivalent and a particle size of at least 80% less than 10 mesh, mixing the iron-bearing metallurgical waste with a carbonaceous material to form a reducible mixture where the carbonaceous material is between 80 and 110% of the stoichiometric amount needed to reduce the iron-bearing waste to metallic iron, and as needed additions to provide a silica content between 0.8 and 8% by weight and a ratio of $CaO/SiO_2$ between 1.4 and 1.8, forming agglomerates of the reducible mixture over a hearth material layer to protect the hearth, heating the agglomerates to a higher temperature above the melting point of iron to form nodules of metallic iron and slag material from the agglomerates by melting.

21 Claims, 20 Drawing Sheets

(56) References Cited

U.S. PATENT DOCUMENTS

| | | | |
|---|---|---|---|
| 5,980,842 A | 11/1999 | Drinkard, Jr. et al. | |
| 5,997,718 A | 12/1999 | Goozner et al. | |
| 6,264,909 B1 | 7/2001 | Drinkard, Jr. | |
| 6,562,096 B1 | 5/2003 | Price et al. | |
| 6,562,101 B1 | 5/2003 | Price et al. | |
| 6,630,010 B2 | 10/2003 | Ito et al. | |
| 6,682,586 B2 | 1/2004 | Frame et al. | |
| 6,831,939 B2 | 12/2004 | Bratina et al. | |
| 7,628,839 B2 * | 12/2009 | Iwasaki et al. | 75/483 |
| 7,632,335 B2 * | 12/2009 | Iwasaki et al. | 75/485 |
| 7,641,712 B2 * | 1/2010 | Iwasaki et al. | 75/485 |
| 7,695,544 B2 * | 4/2010 | Iwasaki et al. | 75/503 |
| 8,021,460 B2 * | 9/2011 | Bleifuss et al. | 75/484 |
| 8,158,054 B2 * | 4/2012 | Iwasaki et al. | 266/216 |
| 2005/0241439 A1 | 11/2005 | Koningen et al. | |
| 2006/0248981 A1 * | 11/2006 | Ito et al. | 75/255 |

OTHER PUBLICATIONS

JP2004-292837 English Machine Translation, Published Oct. 2004.
JP2005-264310 English Machine Translation, Published Sep. 2005.
JP09-143578 English Machine Translation, Published Jun. 1997.

* cited by examiner

|            | $SiO_2$ | $Al_2O_3$ | CaO   | MgO   | Fe   | S    | LOI   |
|------------|---------|-----------|-------|-------|------|------|-------|
| $Al(OH)_3$ I  | —       | 29.94     | —     | —     | —    | —    | —     |
| $Al(OH)_3$ II | —       | 55.90     | —     | —     | —    | —    | —     |
| Bauxite    | 2.53    | 57.35     | 0.09  | 0.04  | 0.04 | —    | —     |
| Bentonite  | 63.46   | 25.70     | 4.53  | 1.40  | 1.40 | —    | —     |
| $CA(OH)_2$ | —       | —         | 75.7  | —     | —    | —    | —     |
| Lime hydrate | 0.71  | 0.65      | 76.67 | 1.12  | —    | —    | 30.84 |
| Limestone  | 0.70    | 0.27      | 47.90 | 0.95  | 1.10 | —    | 43.99 |
| Burnt dolomite | 0.60 | 0.24     | 49.57 | 35.76 | 0.20 | —    | —     |
| Portland cement | 19.61 | 4.63   | 66.65 | 3.32  | 1.77 | 0.90 | —     |

Fig. 4

COMPOSITION OF MILL SCALE SAMPLES

|  | NSAR Mill scale (44-08) | NSDE Mill scale (158-07) | NYS Mill scale (56-08) |
|---|---|---|---|
| T.Fe | 71.95 | 74.44 | 70.69 |
| met Fe | 4.83 | 2.08 | 11.22 |
| FeO | 63.62 | 50.32 | 47.70 |
| $SiO_2$ | 1.28 | 0.26 | 1.78 |
| $Al_2O_3$ | 0.25 | 0.03 | 0.41 |
| CaO | 1.14 | 0.27 | 1.29 |
| MgO | 0.13 | 0.02 | 0.11 |
| MnO | 0.52 | 0.582 | 1.01 |
| Cu | 0.05 | 0.05 | 0.14 |
| Ni | 0.02 | 0.04 | 0.07 |
| Cr | 0.025 | 0.043 | 0.122 |
| Mo | 0.007 | 0.009 | 0.017 |
| Sn |  |  |  |
| Zn |  |  | BDL |
| Cd |  |  | 0.005 |
| Pb |  |  | BDL |
| P | 0.005 | 0.005 | 0.011 |
| S | <0.010 | <0.010 | BDL |
| C | 0.16 | 0.18 | 1.03 |

Fig. 8

SIZE DISTRIBUTION OF MILL SCALE SAMPLES

| Size mesh | NSAR (44-08) %wt | NSAR (44-08) Cum. wt% passing | (89-08) %wt | (89-08) Cum. wt% passing |
|---|---|---|---|---|
| 3/8 | | 100 | | 100 |
| 3 | 0.5 | 99.5 | 0.7 | 99.3 |
| 4 | 0.8 | 98.7 | 0.4 | 98.9 |
| 6 | 1.3 | 97.4 | 0.6 | 98.2 |
| 8 | 1.5 | 95.9 | 1.8 | 96.4 |
| 10 | 0.1 | 95.8 | 7.6 | 88.9 |
| 14 | 18.4 | 77.4 | 12.1 | 76.8 |
| 20 | 27.1 | 50.3 | 18.8 | 58.0 |
| 28 | 16.3 | 34.0 | 19.2 | 38.7 |
| 35 | 12.3 | 21.7 | 11.8 | 27.0 |
| 48 | 8.2 | 13.5 | 9.3 | 17.7 |
| 65 | 4.5 | 9.0 | 6.5 | 11.1 |
| 100 | 3.4 | 5.6 | 5.1 | 6.1 |
| -100 | 6.5 | | 6.1 | |

Fig. 9

ANALYTICAL RESULTS OF PRODUCT FORMED USING MILL SCALE

| Mill scale: EAF slag | Fusion time @ 1400 °C | Micro-metallic iron nodules | %S in metallic iron nodules |
|---|---|---|---|
| 100:0 | 6 min | 0.0 | 0.079 |
| 100:3 | 7 min | 0.0 | 0.072 |
| 100:6 | 7 min | 0.2 | 0.066 |
| 100:9 | 8 min | 0.3 | 0.111 |

Fig. 10

ANALYTICAL RESULTS OF PRODUCT USING MILL SCALE
SHOWING EFFECT OF AMOUNT OF PRB COAL

| PRB coal % stoich. | Fusion time @ 1400 °C | %S in metallic iron nodules |
|---|---|---|
| 70% | >20 min | --- |
| 80% | 10 min | (0.116) |
| 90% | 7 min | 0.103 |
| 100% | 8 min | 0.060 |
| 110% | 8 min | 0.041 |

Fig. 11

COMPOSITION OF METALLURGICAL WASTE SAMPLES

|  | HH IRM (55-08) | HH IRM (92-08) | NSAR C-Fine (57-08) | SDR-WIP (151-08) | EAF Slag (48-05) |
|---|---|---|---|---|---|
| T.Fe | 41.99 | 45.19 | 27.65 | 46.41 | 32.9 |
| met Fe | 18.62 | 7.75 | 7.04 | 26.07 | 2.2 |
| FeO | 25.40 | 30.72 | 12.62 | 21.73 | 25.8 |
| $SiO_2$ | 7.06 | 8.09 | 7.64 | 10.63 | 10.34 |
| $Al_2O_3$ | 3.36 | 3.14 | 10.85 | 4.42 | 4.45 |
| CaO | 8.29 | 10.08 | 27.80 | 14.58 | 27.1 |
| MgO | 3.35 | 6.65 | 8.87 | 8.58 | 11.8 |
| Mn | 2.79 | 2.91 | 2.13 |  | 3.19 |
| Cu | 0.25 | 0.25 | 0.02 | 0.20 |  |
| Ni | 0.04 | 0.04 | 0.02 |  |  |
| Cr | 0.36 | 0.36 | 0.493 |  | 0.51 |
| Mo | 0.016 | 0.021 | 0.002 |  |  |
| Zn | 0.393 | BDL | 0.237 | 0.22 |  |
| Cd | BDL |  | BDL |  |  |
| Pb | 0.002 |  | 0.002 | <0.01 |  |
| P | 0.088 | 0.16 | 0.129 | 0.178 | 0.16 |
| S | 0.90 | 0.84 | BDL | 0.70 | 0.077 |
| C | 14.20 | 4.93 | 0.72 | 0.32 |  |

Fig. 12

SIZE DISTRIBUTION OF HORSEHEAD IRM SAMPLES

| Size mesh | %wt | Cum. wt% passing |
|---|---|---|
| 3/8 | | 100.00 |
| 3 | 3.08 | 96.92 |
| 4 | 4.30 | 92.62 |
| 6 | 2.54 | 90.08 |
| 8 | 3.64 | 86.45 |
| 10 | 1.96 | 84.49 |
| 14 | 8.17 | 76.32 |
| 20 | 16.88 | 59.44 |
| 28 | 13.26 | 46.18 |
| 35 | 12.97 | 33.20 |
| 48 | 10.37 | 22.84 |
| 65 | 6.71 | 16.12 |
| 100 | 6.23 | 9.90 |
| -100 | 9.90 | |

Fig. 13

ANALYTICAL RESULTS FOR MIXTURES OF METALLURGICAL WASTES

| Mix No. | Ex. | HH IRM | NYS mill scale | NSAR C-fines | NSAR mill scale | Keetac conc. | Fusion time (min) | %S in metallic iron nodules |
|---|---|---|---|---|---|---|---|---|
| P-355 | C.E.** | 70* | | | | 30 | >30 | --- |
| P-356 | C.E. | 50* | | | | 50 | 19 | 0.078 |
| P-357 | C.E. | 25* | | | | 75 | 7 | 0.042 |
| P-358 | I.** | | 100 | | | 0 | 9 | 0.096 |
| P-359 | I. | | 50 | | | 50 | 6 | 0.073 |
| P-360 | C.E. | | 25 | | | 75 | 5 | 0.053 |
| P-361 | I. | | 90 | 10 | | 0 | 12 | 0.134 |
| P-362 | I. | | 70 | 15 | | 15 | 12 | 0.137 |
| P-363 | I. | | 55 | 15 | | 30 | 9 | 0.140 |
| P-364 | I. | 20* | | 10 | 70 | | 16 | 0.181 |
| P-365 | I. | 31* | | 9 | 60 | | 20-30 | 0.181 |
| P-366 | C.E. | 41* | | 9 | 50 | | >30 | --- |

* composition of HH IRM was estimated on the basis of total C (14.20%) as reductant.
** C.E. = comparative example; I. = example of present method

Fig. 14

SIZE DISTRIBUTION OF ELKHORN COAL

| Size mesh | %Wt | Cum. %Wt passing |
|---|---|---|
| 28 |  | 100.00 |
| 35 | 1.91 | 98.09 |
| 48 | 2.38 | 95.71 |
| 65 | 3.22 | 92.49 |
| 100 | 5.01 | 87.49 |
| 150 | 7.87 | 79.62 |
| 200 | 12.63 | 66.98 |
| -200 | 66.98 |  |

Fig. 15

PROXIMATE ANALYSIS OF ELKHORN COAL

|  | Elkhorn coal (185-08) |
|---|---|
| Moisture | 10.10 |
| Volatile | 27.46 |
| Fixed carbon | 54.42 |
| Ash | 8.02 |
| Sulfur | 0.63 |
| Btu/lb | 12,345 |

Fig. 16A

ASH MINERAL ANALYSIS OF ELKHORN COAL

|  | Elkhorn coal (185-08) |
|---|---|
| T. Fe | 4.73 |
| $SiO_2$ | 50.37 |
| $Al_2O_3$ | 26.21 |
| CaO | 4.25 |
| MgO | 1.39 |
| $Na_2O$ | 0.52 |
| $K_2O$ | 2.44 |
| S | 1.48 |
| P | 0.12 |

Fig. 16B

COMPOSITION OF BRIQUETTES

| coal % stoich. | mill scale | Elkhorn coal | Hyd. lime | Fluor-spar |
|---|---|---|---|---|
| 85% | 74.65 | 19.85 | 3.5 | 2.0 |
| 95% | 72.8 | 21.6 | 3.6 | 2.0 |
| 100% | 71.85 | 22.5 | 3.65 | 2.0 |
| 105% | 71.0 | 23.3 | 3.7 | 2.0 |

Fig. 17

DROP NUMBERS FOR BRIQUETTES PREPARED FROM REDUCIBLE MIXTURES WITHOUT BINDER

| | Elkhorn coal % stoich. | Briquette Moisture | | Immediate 18" | Oven dried 18" |
|---|---|---|---|---|---|
| Test 56 | 85 | 8.4%* | Average | 4.1 | 1.4 |
| | | | Std. dev. | ±1.6 | ±0.5 |
| Test 58 | 95 | 8.2%** | Average | 2.6 | 2.1 |
| | | | Std. dev. | ±17 | ±1.2 |
| Test 57 | 100 | 7.0%*** | Average | 3.0 | 2.4 |
| | | | Std. dev. | ±1.4 | ±1.6 |
| Test 59 | 105 | 8.3%** | Average | 2.3 | 1.6 |
| | | | Std. dev. | ±1.1 | ±1.0 |

\* Moisture in feed was 9% (slightly excess water).
\*\* Moisture in feed was 8.5% (slightly excess water).
\*\*\* Moisture in feed was 8% (no excess water).

Fig. 18

WEIGHT DISTRIBUTION OF PRODUCTS SHOWING EFFECT OF ELKHORN COAL ADDITION, WITHOUT A BINDER, HEATED AT 1400°C IN A N$_2$-CO ATMOSPHERE

| Elkhorn coal % stoich. | Time at 1400°C | metallic iron nodules | +20 mesh micro-metallic iron nodules | -20 mesh mag. | Slag |
|---|---|---|---|---|---|
| 85% | 5 min* | 83.9 | 0.7 | 1.7 | 13.7 |
| | 20 min | 85.2 | 0.0 | 0.4 | 14.4 |
| 95% | 5 min* | 77.4 | 3.3 | 7.2 | 12.1 |
| | 20 min | 78.7 | 2.1 | 7.0 | 12.2 |
| 100% | 4 min* | 57.8 | 6.7 | 9.5 | 26.0 |
| | 20 min | 79.2 | 2.4 | 5.5 | 12.9 |
| 105% | 4 min* | 59.1 | 13.6 | 18.4 | 8.9 |
| | 20 min | 57.4 | 20.0 | 15.1 | 7.5 |

*time to fusion

Fig. 19A

ANALYTICAL RESULTS OF PRODUCTS SHOWING THE EFFECTS OF ELKHORN COAL ADDITION

| Elkhorn coal % stoich. | Time at 1400*C | metallic iron nodules | |
|---|---|---|---|
| | | %C | %S |
| 85% | 5 min* | 2.59 | 0.040 |
| | 20 min | 2.93 | 0.065 |
| 95% | 5 min* | 2.18 | 0.051 |
| | 20 min | 3.41 | 0.026 |
| 100% | 4 min* | 2.26 | 0.038 |
| | 20 min | 3.35 | 0.027 |
| 105% | 4 min* | 2.55 | 0.027 |
| | 20 min | 4.11 | 0.017 |

*time to fusion.

Fig. 19B

DROP NUMBERS FOR BRIQUETTES PREPARED FROM REDUCIBLE MIXTURES WITH INCREASING AMOUNT OF BINDER

|         | Molasses% | Briquette Moisture* |           | Immediate 18" | Oven dried 18" |
|---------|-----------|---------------------|-----------|---------------|----------------|
| Test 57 | 0         | 7.0%                | Average   | 3.0           | 2.4            |
|         |           |                     | Std. dev. | ±1.4          | ±1.6           |
| Test 66 | 2         | 7.6%                | Average   | 5.6           | 6.6            |
|         |           |                     | Std. dev. | ±3.3          | ±2.7           |
| Test 67 | 4         | 7.4%                | Average   | 9.6           | 12.0           |
|         |           |                     | Std. dev. | ±4.3          | ±4.3           |
| Test 65 | 6         | 7.4%                | Average   | >50           | >50            |
|         |           |                     | Std. dev. |               |                |

* Moisture in feed was 8.5%.

COMPOSITION OF FEED BRIQUETTES

| Elkhorn coal % stoich. | mill scale | Elkhorn coal | Hyd. lime | Fluor-spar |
|---|---|---|---|---|
| 75% | 76.6 | 18.0 | 3.4 | 2.0 |
| 85% | 74.65 | 19.85 | 3.5 | 2.0 |
| 95% | 72.8 | 21.6 | 3.6 | 2.0 |

WEIGHT DISTRIBUTION OF PRODUCTS SHOWING EFFECT OF ELKHORN COAL ADDITION AT DIFFERENT LEVELS OF MOLASSES ADDITION, HEATED AT 1400°C FOR 20 MINUTES IN A N2-CO ATMOSPHERE

| Elkhorn coal % stoich. | Molasses % | metallic iron nodules | +20 mesh micro-metallic iron nodules | -20 mesh mag. | Slag |
|---|---|---|---|---|---|
| 85 | 0 | 84.6 | 0.4 | 0.7 | 14.3 |
| 95 | 0 | 80.9 | 1.9 | 4.0 | 13.2 |
| 100 | 0 | 73.8 | 6.4 | 8.0 | 11.8 |
| 105 | 0 | 67.8 | 11.3 | 10.2 | 10.7 |
| 100 | 2 | 75.4 | 5.5 | 7.6 | 11.5 |
| 100 | 4 | 74.1 | 8.9 | 5.1 | 11.9 |
| 100 | 6 | 51.0 | 26.7 | 14.0 | 8.3 |

Fig. 24A

ANALYTICAL RESULTS OF PRODUCTS SHOWING THE EFFECTS OF ELKHORN COAL ADDITION AND MOLASSES ADDITION

| Elkhorn coal % stoich. | Molasses | NRI | |
|---|---|---|---|
| | | %C | %S |
| 85 | 0 | 3.27 | 0.049 |
| 95 | 0 | 3.52 | 0.029 |
| 100 | 0 | 3.47 | 0.027 |
| 105 | 0 | 3.62 | 0.025 |
| 100 | 2 | 3.40 | 0.025 |
| 100 | 4 | 3.70 | 0.026 |
| 100 | 6 | 3.99 | 0.019 |

Fig. 24B

PERCENT CARBON IN BRIQUETTES SHOWING EFFECTS OF ELKHORN COAL ADDITION AND PRESENCE OF MOLASSES

| Test No. | Elkhorn coal %wt | (%stoich.) | Molasses % | Mix No. (Test No.) | %C |
|---|---|---|---|---|---|
| 56 | 19.85 | (85) | 0 | P-492 | 14.89 |
| 58 | 21.6 | (95) | 0 | P-494 | 16.27 |
| 57 | 22.5 | (100) | 0 | P-493 | 16.78 |
| 59 | 23.3 | (105) | 0 | P-495 | 17.53 |
| 66 | 22.5 | (100) | 2 | P-493 | 16.92 |
| 67 | 22.5 | (100) | 4 | P-493 | 16.84 |
| 65 | 22.5 | (100) | 6 | P-493 | 17.98 |
| 72 | 18.0 | (75) | 4 | P-507 | 14.06 |
| 71 | 19.85 | (85) | 4 | P-492 | 15.02 |
| 70 | 21.6 | (95) | 4 | P-493 | 16.57 |

Fig. 25

ANALYTICAL RESULTS OF PRODUCTS SHOWING THE EFFECTS
OF ELKHORN COAL ADDITION AND MOLASSES ADDITION

| Elkhorn coal %stoich. | Molasses % | Mix No. (Test No.) | NRI %C | NRI %S |
|---|---|---|---|---|
| 75 | 4 | P-507 (B-982) | 3.18 | 0.054 |
| 85 | 4 | P-492 (B-981) | 3.46 | 0.037 |
| 95 | 4 | P-494 (B-980 | 3.48 | 0.028 |

Fig. 28

PRODUCTION OF IRON FROM METALLURGICAL WASTE

This application is a continuation of International Patent Application No. PCT/US2010/021790, filed on Jan. 22, 2010, which claims priority to and the benefit of U.S. patent application Ser. No. 61/146,455, filed on Jan. 22, 2009, the aforementioned applications PCT/US2010/021790 and Ser. No. 61/146,455 are incorporated herein by reference.

GOVERNMENT INTERESTS

The present invention was made with support by the Economic Development Administration, Grant No. 06-69-04501, and the Department of Energy, Sponsor Award DE-FG36-05GO15185. The United States government has certain rights in the invention.

BACKGROUND AND SUMMARY

In the making of steel, metallurgical waste dust and sludge is created and collected from various sources. For example, in making of steel by electric arc furnace (EAF), EAF dust is generated that is typically collected in a baghouse or an electrostatic precipitator. Thirty or forty pounds of such EAF dust may be created for each ton of steel produced by EAF process. Similarly, in making steel by basic oxygen furnace (BOF), BOF dust is generated that is typically collected in a baghouse or an electrostatic precipitator in similar quantities. Cooling of the steel during processing using water also produces mill scale in relatively large quantities typically as sludge. In downstream processing in steelmaking, there may also be dust and sludge, such as galvanizing dust and sludge, from galvanizing and other hot dip coating, and spent pickle liquor from cleaning rust from intermediate steel products in pickling lines. In upstream processing, there may also be DRI dust or fines generated in the process of forming DRI from iron ore for use as a starting material in steelmaking, taconite tailings from the beneficiation of taconite to form taconite pellets used as a starting material, and blast furnace slag in making of pig iron in a blast furnace. There may also be fly ash collected in the stacks and flues in both upstream and downstream processes as well as the making of the steel itself.

These steelmaking dusts and sludges are high in iron content, but difficult to recycle or reclaim economically. EAF dust, for example, can be up to 50% by weight iron largely as iron oxide, but may also contains up to 30% by weight zinc and smaller quantities of calcium, magnesium, manganese, lead, cadmium and other metallic elements typically as simple and complex oxides. Because of the high levels of zinc, cadmium and lead, EAF dust, in particular, has been listed as a hazardous waste (KO61) in 40 C.F.R. §261.32 under the Resource Conservation and Recovery Act ("RCRA"), 42 U.S.C. §6901 et seq., requiring specific record keeping and particular handling and processing costs in disposal or recycling. While EAF dust has been subject to stabilization processes and disposed in landfills at considerable cost, one strategy has been to process the EAF dust in a BOF furnace into BOF dust and sludge that contains lower levels of zinc, cadmium and lead. See U.S. Pat. Nos. 6,562,096 and 6,562,101. BOF dust and sludge can be reused directly in steelmaking at some locations, or processed in an induction furnace to produce hot metal or pig iron (See U.S. Pat. No. 6,831,939); however, much BOF dust and sludge has been disposed as waste in land fills.

In another strategy, EAF dust is processed through a tunnel kiln to vaporize and oxidize the dust to recover high purity zinc oxide, and then the low zinc EAF dust is disposed of in land fills. See U.S. Pat. No. 6,682,586. In this process, lead and cadmium in the EAF can be halogenated and vaporized, and volatized halogens of lead and cadmium collected in the baghouse for recovery.

Another approach is to dissolve the EAF dust in nitric acid solution to form nearly complete dissolution of the iron, zinc, cadmium, copper, magnesium, calcium, manganese and lead. See U.S. Pat. No. 5,912,402. Iron is precipitated from the solution by raising the pH and/or by elevating the temperature. Cadmium, copper and lead are then removed in an electrolytic cell with copper and cadmium collected on the cathode and lead collected on the anode. Then calcium nitrate is removed by leaching from a filtrate, and the resulting residue treated with metal amine complexing agents such as ammonium carbonate, ammonium hydroxide, or similar agents to recover the zinc, leaving manganese and magnesium to be separated by acid. This approach resulted in separate recovery of various constituent metals in EAF dust, but has proved expensive and resulted in ancillary environmental concerns with the acids used.

A common metallurgical waste is mill scale, which is ubiquitous in steelmaking. Mill scale includes various forms of iron oxide formed at the surface of steel by oxidation from the surrounding atmosphere. See The Making, Shaping and Treating of Steel, at 946-947 (9th Ed. 1971). Mill scale is formed during heating, hot working and cooling of steel slabs, steel strip, blooms, and billets, as well as most other types of intermediate and finished steel products. The presence of such mill scale is particularly objectionable on the intermediate product to be further processed. For example, such scale typically must be removed and a clean steel surface provided if satisfactory results are to be obtained from the hot rolling of sheet or strip involving reduction or deformation of the steel. Similarly, if the steel sheet is for hot or cold drawing applications, the mill scale is removed as its presence on the steel surface tends to shorten die life, cause irregular and defective drawing conditions, and cause surface defects on the finish product. Scale is also removed if the sheet or strip is to be processed with a hot dip coating to permit proper alloying and adherence of the metallic coating, and satisfactory adherence when non-metallic coatings or paints are to be applied. Even where not a hazardous waste, mill scale such as BOF dust and sludge has been typically disposed of in land fills at considerable cost.

Additionally, other sources of iron-containing waste materials are available. In certain regions, iron-containing mine waste, such as wash-ore tailings and red ore tailings may be available for recovery of iron. Although there are considerable iron units in mill scale and similar metallurgical waste, there has not been available a commercially practical way of reclaiming or recycling of metallurgical waste.

One prior approach commonly used in the disposal of mill scale and similar metallurgical wastes in steelmaking was to "stabilize" or "capture" the waste material in a generally non-leachable form, typically with a basic material, such as lime or cement. Such stabilized waste materials subsequently are buried in designated waste landfills.

In the past, raw materials containing large amounts of FeO have been a problem in solid state reduction processes in hearth furnaces. In such previous processes, FeO melted before being reduced, called "smelting reduction," producing a highly fluid and aggressive slag. Even the melted FeO that reacted with carbon in reduction caused damage and erosion of refractory hearths. Moreover, large amounts of FeO typically remained in the slag reducing the effectiveness of the reduction process. U.S. Pat. No. 6,630,010 to Ito, et al. discloses a method of reducing metallic waste containing iron oxides describing a complex two step heating process to reduce FeO.

The need for a commercially practical way of reclaiming or recycling iron from mill scale and similar metallurgical waste has been emphasized by public awareness of environmental issues in solid waste, the decreasing availability of landfill areas, and the continuing awareness of the earth's mineral resources. Additionally, economic pressures and the tightening of competition for uses of the earth's natural resources have increased. Further, federal and state regulations regarding the use of the earth's natural resources and the disposal of waste materials have become more encompassing and more restrictive. As a result, there remains a need for reducing mill scale and similar metallurgical waste, and reclaiming and recycling of iron units where economically possible.

What is disclosed is a practical and economical way of disposing of mill scale and similar metallurgical waste in steelmaking, while reclaiming valuable iron units from these metallurgical wastes. It provides as a by-product nodular reduced metallic iron (NRI) that can be used as a substitute for scrap in economically making steel by EAF process.

A method of recovering metallic iron from iron-bearing metallurgical waste in steelmaking is disclosed, including steps of:

(a) providing an iron-bearing metallurgical waste containing more than 55% by weight FeO and FeO equivalent and a particle size of at least 80% less than 10 mesh, (b) mixing the iron-bearing metallurgical waste with a carbonaceous material to form a reducible mixture where the carbonaceous material is between 80 and 110% of the stoichiometric amount needed to reduce the iron-bearing waste to metallic iron, and as needed additions to provide a silica content between 0.8 and 8% by weight and a ratio of CaO/$SiO_2$ between 1.4 and 1.8, (c) forming agglomerates of the reducible mixture over a hearth material layer to protect the hearth, (d) heating the agglomerates to a higher temperature above the melting point of iron to form nodules of metallic iron and slag material from the agglomerates by melting.

The carbonaceous material in the reducible mixture may be between 85 and 100% of the stoichiometric amount needed to reduce the iron-bearing waste to metallic iron.

The iron-bearing metallurgical waste is typically mill scale. Mixed with the mill scale may be iron-bearing metallurgical waste selected from the group of DRI fines, processed EAF dust, BOF sludge, blast furnace dust, wash ore tailings, red ore tailings, and mixtures thereof. The mixture is particular advantageous when the availability of mill scale is in short supply.

The mill scale and similar iron-bearing metallurgical waste may be provided of at least 80% less than 14 mesh. Additionally, the method may further include the step of mechanically reducing particle size of the iron-bearing metallurgical waste to at least 80% less than 14 mesh. The iron-bearing metallurgical waste may be mixed with less than 8% by weight lime and less than 4% by weight fluorspar.

In the present method, the silica source may be at least in part from the iron-bearing metallurgical waste. The silica source may be at least partially selected from the group consisting of sand, EAF slag, LMF slag, BOF slag, fly ash, taconite tailings, wash ore tailings, floatation tailings, DRI fines, blast furnace slag, and mixtures thereof.

The hearth material layer may be a carbonaceous material selected from the group consisting of PRB coal/char, bituminous coal, anthracite and coke of more than 80% between 100 mesh and 3 mesh.

In the present method during the heating step the agglomerate may be heated to greater than 2450° F.

The method may include the additional step after forming the agglomerates and before heating the agglomerates of providing an overlayer of coarse carbonaceous material of between 6 mesh and 1 inch over the agglomerates. Alternatively, the overlayer of coarse carbonaceous material may be between 6 mesh and 5/8 inch. The overlayer of coarse carbonaceous material may be between about 0.5 lb/ft$^2$ (2.44 kg/m$^2$) and about 1.25 lb/ft$^2$ (6.10 kg/m$^2$).

The iron-bearing metallurgical waste may be mixed with a combination of high volatile carbonaceous material selected from the group consisting of sub-bituminous coal and PRB coal and low volatile carbonaceous material selected from the group consisting of anthracite, bituminous coal, coke breeze, coke, and char as the carbonaceous material.

The step of forming the agglomerates on the hearth may involve first forming agglomerates of the reducible mixture and then placing the agglomerates on the hearth material layer.

The above summary of the present invention is not intended to describe each embodiment or every implementation of the present invention. A more complete understanding of the invention and its advantages will become apparent by referring to the following detailed description and claims in conjunction with the accompanying drawings.

BRIEF DESCRIPTION OF THE DRAWINGS

FIG. 4 shows a table giving chemical compositions of one or more additives that may be used in embodiments of the metallic iron nodule reduction process from mill scale illustrated in FIG. 1;

FIG. 8 is a table showing compositions of mill scale samples for use in making metallic iron nodules by the present method;

FIG. 9 is a table showing particle size distribution of mill scale samples for use in making metallic iron nodules by the present method;

FIG. 10 is a table analytical results of product formed using mill scale showing amount of micro metallic iron nodules generated and amount of sulfur in metallic iron nodules made by the present method;

FIG. 11 is a table showing analytical results of product formed using mill scale and the effect of amount different stoichiometric amounts of PRB coal by the present method;

FIG. 12 is a table showing composition of mill scale and metallurgical waste samples for use in mixing with mill scale in the present method;

FIG. 13 is a table showing size distribution of samples of Horsehead IRM metallurgical waste for use in mixing with mill scale in the present method;

FIG. 14 is a table showing composition of mill scale and metallurgical waste samples for use in mixing with mill scale in the present method;

FIG. 15 is a table showing size distribution of Elkhorn coal for use in mixing with mill scale in forming reducible mixture for use in making metallic iron nodules by the present method;

FIGS. 16A and 16B are tables showing proximate and ash mineral analysis of Elkhorn coal describe in FIG. 15;

FIG. 17 is a table showing composition of reducible mixture with different stoichiometric amounts of Elkhorn coal, hydrated lime and fluorspar formed into briquettes for use in the present method;

FIG. 18 is a table showing drop test results for briquettes with different stoichiometric amounts of Elkhorn coal prepared from reducible mixtures without a binder for use in the present method;

FIG. 19A is a table showing weight distribution of products and the effect of with different stoichiometric amounts of Elkhorn coal addition, without a binder, heated at 1400° C. in a $N_2$—CO atmosphere in the present method;

FIG. 19B is a table showing analytical results of products and with the effect of different stoichiometric amounts Elkhorn coal addition for use in the present method;

FIG. 24A is a table showing weight distribution of products and with different stoichiometric amounts of Elkhorn coal and different levels of molasses addition, heated at 1400° C. for 20 minutes in a N2—CO atmosphere in the present method;

FIG. 24B is a table showing analytical results of percent carbon and percent sulfur in the metallic nodules made from as described in FIG. 24A by the present method;

FIG. 25 is a table showing percent carbon in briquettes with different stoichiometric amounts of Elkhorn coal addition and of molasses binder used in the present method;

FIG. 28 is a table showing the percent carbon and percent sulfur in metallic iron nodules with different stoichiometric percentages of Elkhorn coal addition and percentages of molasses addition using the present method.

DETAILED DESCRIPTION OF THE DRAWINGS

Figure 1:
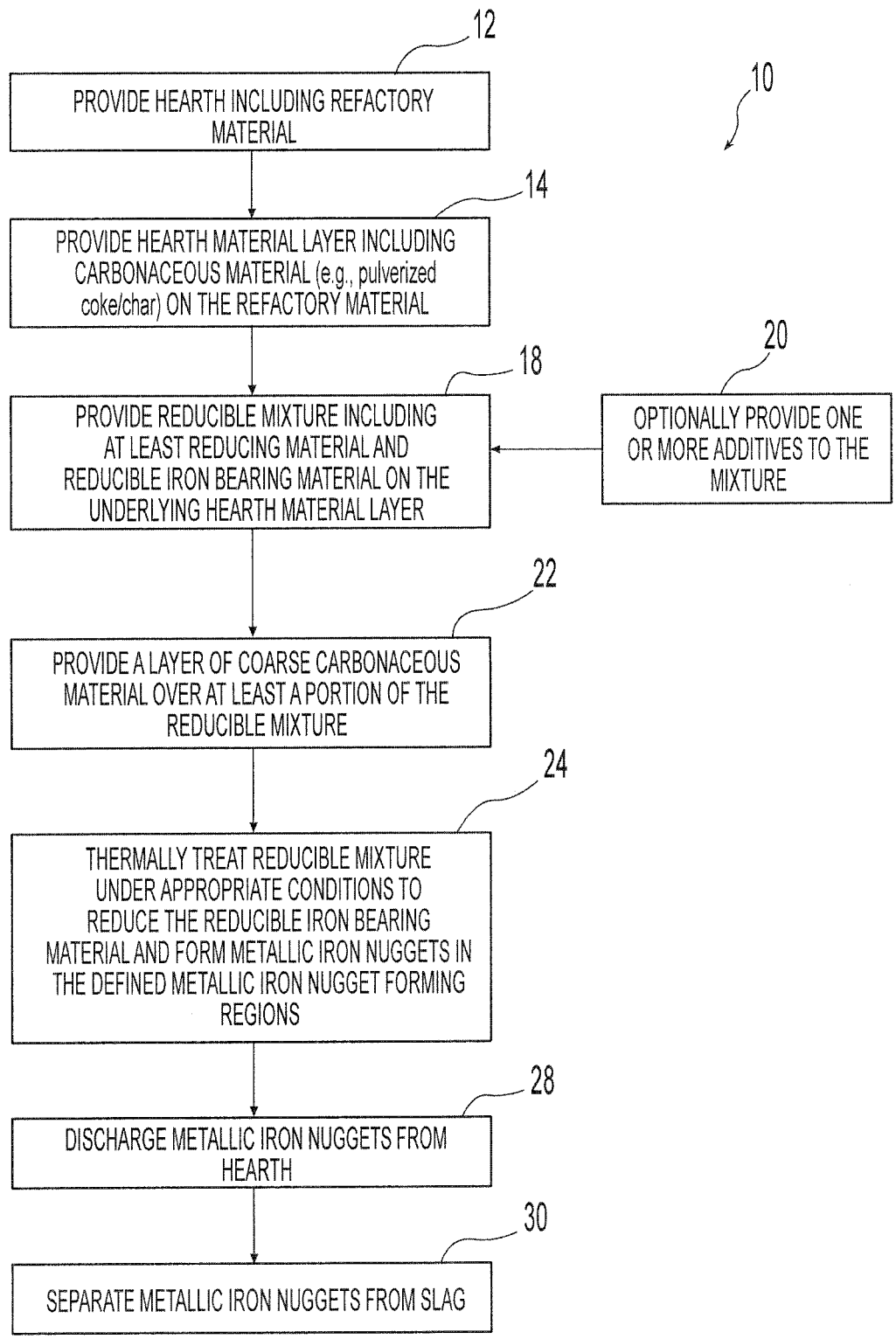
FIG. 1 shows a block diagram of one or more general embodiments of a metallic iron nodule reduction process from mill scale of the present disclosure.
Figure 2:
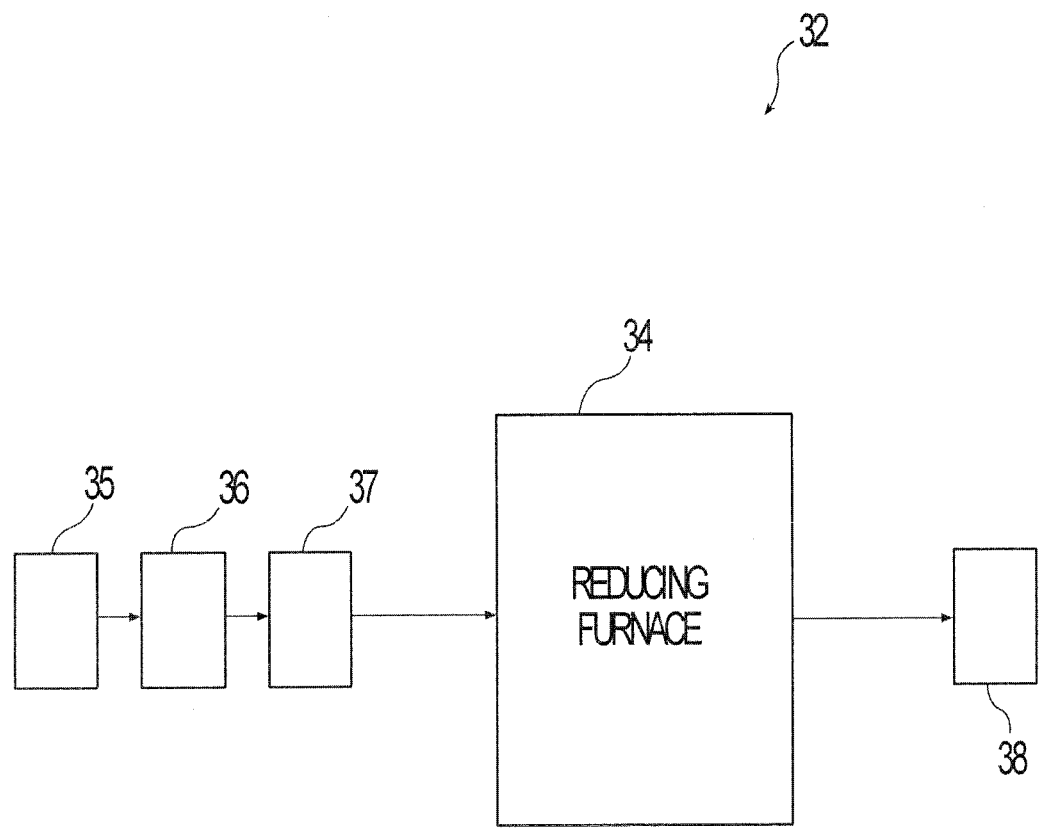
FIG. 2 is a generalized block diagram of a furnace system for implementing the present metallic iron nodule reduction process from mill scale such as that shown generally in FIG. 1.
Figure 3:
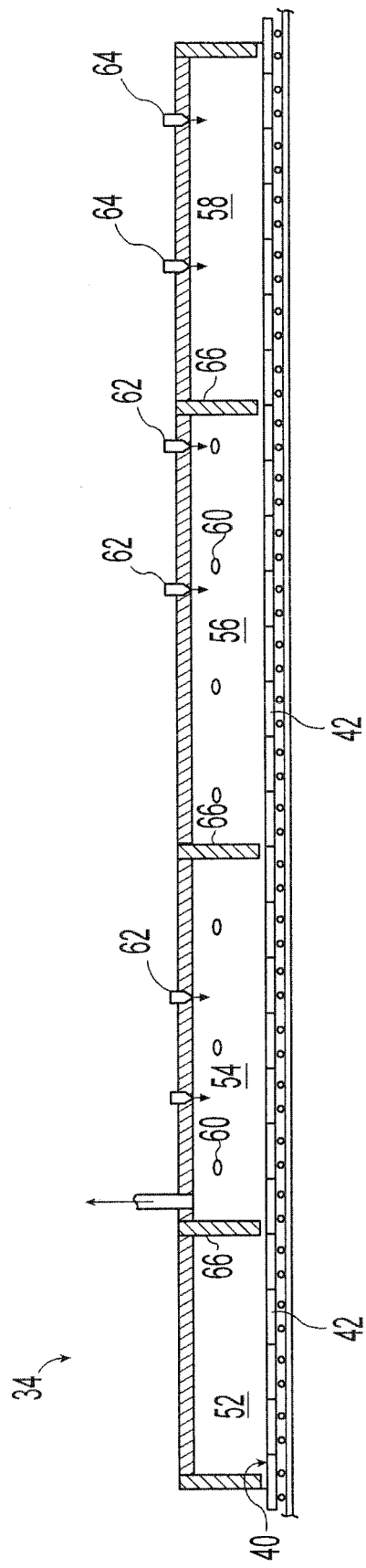
FIG. 3 is a diagrammatical section view through a linear hearth furnace that may be used to carry out one or more processes described herein, and produce metallic iron nodules described herein.

Referring now to FIGS. 1 through 3, disclosed is a process for the production of metallic iron nodules from mill scale and mixtures of mill scale with similar iron-bearing metallurgical waste. As explained below, the disclosed process permits control of the amount of sulfur in the produced metallic iron nodules while reclaiming iron units from metallurgical waste high in FeO.

FIG. 1 shows a block diagram of one or more generalized illustrative embodiments of a metallic iron nodule process 10 producing nodule iron nodules from mill scale and mixtures of mill scale with similar metallurgical waste. The metallic iron nodule process 10 shown in the block diagram will be described with further reference to a more detailed embodiment shown in FIG. 3. One skilled in the art will recognize that one or more of the process steps described with reference to the metallic iron nodule process 10 may be optional. For example, block 20 is labeled as being optionally provided. As such, it will be recognized that the metallic iron nodule process 10 is an illustrative embodiment, and that the present invention is not limited to any specific process embodiments described herein, but rather as described in the accompanying claims.

Figure 5:
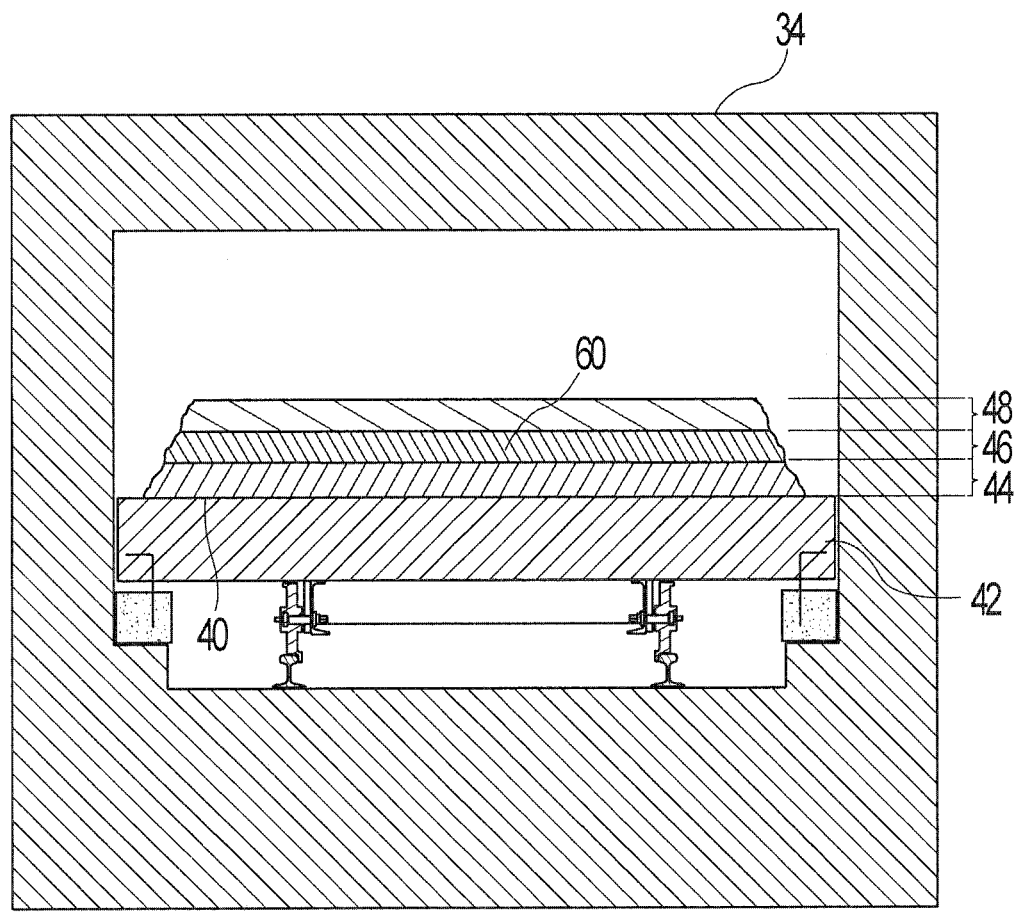
FIG. 5 is a generalized cross-section view of a linear hearth furnace used in implementing the present metallic iron nodule reduction process from mill scale and mixtures with similar metallurgical waste.

As shown in block 12 of FIG. 1, a hearth 40 is provided such as shown in FIG. 5. The hearth 40 may be any moving hearth suitable for use with a hearth furnace system 32 (e.g., such as that shown generally in FIG. 2) operable for use in carrying out the metallic iron nodule process 10. The hearth 40 may be a hearth suitable for use in a rotary hearth furnace, a linear hearth furnace such as shown in FIG. 3, or any other furnace system operable for implementation for direct reduction of metallic iron nodules. Generally, the hearth 40 includes a refractory material upon which materials to be processed (e.g., feed material) is received. The refractory material may be, for example, refractory board, refractory brick, ceramic brick, or a castable refractory.

Additionally, a combination of refractory board and refractory brick may be selected for thermal protection for an underlying substructure. In one or more embodiments, the hearth may include a supporting substructure that carries the refractory material (e.g., a refractory lined hearth) forming the hearth 40. The supporting substructure may be formed from one or more different materials, such as, for example, stainless steel, carbon steel, or other metals, alloys, or combinations thereof that have the required high temperature characteristics for furnace processing.

With reference to block 14 of FIG. 1 and to FIG. 5, a hearth material layer 44 may be provided above the hearth 40. The hearth material layer 44 may include at least one carbonaceous material. As used herein, carbonaceous material refers to any carbon-containing material suitable for use as a reductant with the iron-bearing material. The hearth material layer 44 may include coke, char, other carbonaceous material, or mixtures thereof. For example, anthracite coal, sub-bituminous coal, coke, coke breeze, graphite, or char materials may be used for the hearth material layer 44. We have found that certain bituminous and sub-bituminous (e.g. Powder River Basin) coals may be used in mixtures with anthracite coal, coke, coke breeze, graphite, or char materials.

The hearth material layer 44 may comprise a mixture of finely divided coal and a material selected from the group of coke, char, and other carbonaceous material found to be beneficial to increase the efficiency of iron reduction. The coal particles may be a mixture of different coals such as non-coking coal, or non-caking coal, sub-bituminous coal, or lignite. The hearth material layer 44 may include Powder River Basin ("PRB") coal and/or char. Additionally, although up to one hundred percent coal is contemplated for use as a hearth material layer, in some embodiments the finely divided coal may comprise up to twenty-five percent (25%) and may be mixed with coke, char, other carbonaceous material, or mixtures thereof. In other embodiments, up to fifty percent (50%) of the hearth material layer may comprise coal, or up to seventy-five percent (75%) of the hearth material layer may comprise coal, with the remaining portion coke, char, other carbonaceous material, or mixtures thereof.

Using coal in the hearth material layer provides volatiles in the coal to the furnace to be combusted providing heat for the process. The volatiles can be directly burned near the location of their volatilization from the coal, or may be communicated to a different location in the furnace to be burned at a more desirable location. Regardless of the location in the hearth furnace, the volatiles can be consumed to heat the reducible material efficiently. Thus, the addition of coal may decrease the necessity for externally supplied fuel sources while still protecting the hearth refractories.

The hearth material layer 44 may be provided in a thickness sufficient to prevent molten slag from penetrating the hearth material layer 44 and contacting the refractory material of the hearth 40. For example, the carbonaceous material may be ground or pulverized to an extent such that it is fine enough to prevent the slag from such penetration, but typically not so fine as to create excess ash. Contact of molten slag with the refractory hearth 40 during the metallic iron nodule process 10 may produce undesirable damage to the refractory material of hearth 40. A suitable particle size for the hearth layer is less than 6 mesh and desirably between 6 and 100 mesh where the reducible material is formed in situ. For separately formed reducible mixtures in briquettes, balls, or other compacts, the hearth material may be, for example, −3 mesh or larger as desired. A hearth layer thickness of between about ½ to one inch may be effective protection for the hearth 40 from penetration of the slag and metallic iron during processing. Alternatively, the hearth layer thickness may be greater than one inch, such as up to 2 inches, or more, as desired. Carbonaceous material less than 100 mesh is generally high in ash and also may result in entrained dust that is difficult to handle in commercial operations. Carbonaceous material less than 100 mesh is typically higher in ash and may react with the hearth refractory As used herein, measurements of mesh sizes of particles are provided in Tyler Mesh Size.

Referring to block 18 of FIG. 1 and to FIG. 5, a reducible mixture 46 is provided above the hearth 40, and may be placed on the hearth material layer 44. Further, multiple layers of the reducible mixture 46 may optionally be provided above the hearth 40. The reducible mixture 46 includes at least a reducible iron-bearing material and a reducing material for the production of iron metal nodules.

The reducible mixture 46 may contain mill scale containing more than 55% by weight FeO and FeO equivalent. FeO equivalent is formed from metallic Fe (Fe°). FeO equivalent is defined as the lesser of:

metallic Fe×3×72/56, or (total Fe−metallic Fe−(FeO×56/72))×3/2×72/56.

Alternatively, the reducible mixture 46 may contain a mixture of mill scale with other similar metallurgical waste as described below, the mixture containing more than 55% by weight FeO and FeO equivalent. For example, the similar metallurgical waste for mixing with mill scale may include recyclable iron-bearing material, pellet plant wastes and pellet screened fines. Such pellet plant wastes and pellet screened fines may include a substantial quantity of hematite. In one alternative, the iron-bearing metallurgical waste material includes a mixture of mill scale and at least one selected from the group consisting of processed electric arc furnace (EAF) dust, basic oxygen furnace (BOF) sludge, blast furnace dust, and mixtures thereof. Alternatively, or in addition, iron bearing material metallurgical waste material for mixing with mill scale may include iron ore concentrate, taconite pellets, magnetite concentrates, oxidized iron ores, and red ore tailings. Also, less expensive iron ores high in silica may be used. In yet another alternative, the iron-bearing material may include micro metallic iron nodules formed in the process of producing metallic iron nodules. Micro metallic iron nodules, or micro-nodules, include small particles of agglomerated iron having a size between about 20 mesh and about 3 mesh. Metallic iron nodules less than 20 mesh can also be used depending on handling to recycle.

The reducible mixture 46 may include mill scale more than 55% FeO and FeO equivalent, or mixtures of mill scale with similar metallurgical waste materials. The iron-bearing metallurgical waste may, for example, be one hundred percent (100%) mill scale or be mill scale mixed with DRI fines or processed EAF dust, or other similar metallurgical waste.

The iron-bearing material may be finely-ground or otherwise physically reduced in particle size. The particle size of the mill scale or mixture of mill scale and similar metallurgical waste may be at least 80% less than 10 mesh. Alternatively, the iron-bearing metallurgical waste may be of a particle size of at least 80% less than 14 mesh. In one alternative, the iron-bearing material may be ground to less than 65 mesh (i.e., −65 mesh) or less than 100 mesh (i.e., −100 mesh) in size for processing according to the disclosed processes. Larger size particles, however, of iron-bearing material may also be used. For example, pellet screened fines and pellet plant wastes are generally approximately 3 mesh (about 0.25 inches) in average size. Such material may be used directly, or may be reduced in particle size to increase surface contact of carbonaceous reductant with the iron bearing material during processing. A smaller particle size tends to reduce fusion time in the present method.

The reducing material in the reducible mixture 46 comprises carbonaceous material. The carbonaceous material may be ground to 100 mesh or smaller in size. Alternatively, such carbonaceous material may be provided in the range of 65 mesh to 100 mesh. However, carbonaceous material in the range between about 200 mesh to about 8 mesh may also be used. The use of coarse carbonaceous material (e.g., coal) may require increased amounts of coal in the reducible mixture for carrying out the reduction process. Finer ground carbonaceous material may be more effective in the reducible mixture. We have found that larger sized carbonaceous material may also be used. For example, carbonaceous material of less than about 6 to 7 mesh (e.g., about 0.13 inch to about 0.11 inch) in average size may be used directly in the reducible mixture 46, or may be ground to −65 or −100 mesh for better contact and more efficiently react with the iron-bearing reducible material during processing. When other additives are also added to the reducible mixture, such additives may also be ground to a particle size similar to the particle size of the carbonaceous material, as desired.

Various carbonaceous materials may be used in providing the reducible mixture of reducing material and reducible iron-bearing material. For example, eastern anthracite and bituminous non-caking coals may be used as the carbonaceous reductant in at least one embodiment. However, sub-bituminous non-caking coal may also be used, such as PBR coal. Sub-bituminous coal may be useful in some geographical regions, such as on the Iron Range in Northern Minnesota, as such coals are more readily accessible with the rail transportation systems already in place and in some cases are lower in cost and lower in sulfur levels. As such, western sub-bituminous coals may be used in one or more processes as described herein. Alternatively, or in addition, the sub-bituminous coals may be carbonized, such as at 900° C., prior to its use. Other coals may be provided, such as low sulfur bituminous coal from Elkhorn seams from eastern Kentucky, as described below. In any case, the carbonaceous material in the reducible mixture may contain an amount of sulfur in a range from about 0.2% to about 1.5%, and more typically, in the range of 0.5% to 0.8%.

The amount of reducing material in the mixture of reducing material and reducible iron bearing material will depend on the stoichiometric quantity necessary for complete metallic reduction of the iron in the reducing reaction in the furnace process. Such a quantity may vary depending upon the iron-bearing metallurgical waste material used in the mixture with mill scale, on the furnace used, and on the furnace atmosphere in which the reducing reaction takes place. The reducible mixture 46 may include an amount of carbonaceous material that is between 80 and 110% of the stoichiometric amount needed to reduce the iron-bearing material to metallic iron. In one or more alternative embodiments, the quantity of reducing material necessary to carry out the reduction of the iron-bearing metallurgical material is between about 85 percent and 105 percent of the stoichiometric quantity of reducing material needed for carrying out the reduction to completely metallize the iron. For certain reducible mixtures 46 containing mill scale, the carbonaceous material may be used at different stoichiometric levels, such as 90 percent or 100 percent depending upon the iron-bearing metallurgical waste material used in the mixture with mill scale. In one alternative, the carbonaceous material may be between 90 and 105% of the stoichiometric amount needed to reduce the iron-bearing waste mixture to metallic iron.

As shown by block 20 of FIG. 1, additives may optionally be provided to the reducible mixture 46, for one or more purposes, in addition to the reducing material (e.g., coal or char) and reducible iron-bearing material (e.g., iron oxide material or iron ore). For example, additives may be provided (i) for controlling slag basicity, (ii) for binders to provide binder functionality (e.g., lime can act as a weak binder in a micro-agglomerate configuration when wetted), (iii) for controlling the slag fusion temperature, (iv) to reduce the formation of micro-nodules, and/or (v) for further controlling the content of sulfur in resultant iron nodules formed by the metallic iron nodule process 10. The table of FIG. 4 shows the chemical compositions of various additives to the reducible mixture 46. That includes, for example, chemical compositions such as $Al(OH)_3$, bauxite, bentonite, $Ca(OH)_2$, lime hydrate, limestone, and Portland cement. Other additives may also be used such as fluorspar or $CaF_2$, $Na_2CO_3$, soda ash, aluminum smelter slag, cryolite, and $SiO_2$. One or more of such additives, separately or in combination, may provide for beneficial results when used in the metallic iron nodule process 10. Some of the illustrated additives contain trace amounts of Mg, as shown. Mg, in compounds such as dolomite, should be avoided and in any event is not used in quantities that will produce 5% mass or more MgO in the resulting slag.

Further, rather than adding $Ca(OH)_2$ to the feed material, EAF slag instead may be added to the feed material. Typical EAF slag contains about thirty percent (30%) by weight of lime or calcium oxide (CaO). The addition of EAF slag not only provides a mechanism to dispose of another metallurgical waste through recycling of the waste, but also lessens the dependence on external supplies of hydrated lime. Additionally, fluorspar ($CaF_2$) also may be added to the reducible mixture 46, as discussed below. The reducible mixture 46 may include iron-bearing metallurgical waste mixed with less than 8% by weight lime and less than 4% by weight fluorspar. Additives may be added before or after grinding, or both.

The reducible mixture 46 may include, as needed, additions to provide a silica content between 0.8 and 8% by weight and a ratio of $CaO/SiO_2$ between 1.4 and 1.8. The silica source may be at least in part from the iron-bearing metallurgical waste provided as an iron-bearing material. Alternatively, or in addition, the silica source may be at least partially selected from the group consisting of sand, EAF slag, LMF slag, BOF slag, fly ash from steelmaking and other sources, taconite tailings, wash ore tailings and other gravity concentration tailings, floatation tailings of nonferrous metals and nonmagnetic ores, DRI fines, blast furnace slag, and mixtures thereof, and other industrial byproducts. For example, if mill scale, or mixtures thereof, is used that has low silica content, silica may be added before or after grinding. In one embodiment, silica may added by an amount to obtain a feed material having approximately five percent by weight of silica. The silica content helps drive sulfur in the iron-bearing industrial waste into the slag during iron and slag melting, fusing, and partitioning in the formation of metallic iron nodules.

The reducible mixture 46 may be provided above the hearth in a layer of reducible mixture 46. Alternatively or in addition, the reducible mixture 46 may be formed into agglomerates or compacts such as briquettes, balls, or extrusions before being placed above the hearth 40 for use in the disclosed process of forming metallic iron nodules. For example, for agglomerates containing coal at 80% of the stoichiometric amount to completely reduce the iron oxide, balls may have a density of about 2.1 $g/cm^3$, and briquettes or extrusions may have a density of about 2.1 $g/cm^3$. It should also be noted that different pressurization during formation of the agglomerates may result in different processing characteristics as desired for the particular embodiment of the present process. One or more binders may be added to the feed material as desired to achieve a desired strength of agglomeration, such as molasses. Certain binders, such as molasses, provide in addition a source of carbon.

In yet another alternative, not shown, the reducible mixture may be provided above the hearth in a layer, and then channel openings formed in the reducible mixture layer that extend at least partially through the reducible mixture layer. Additionally, the reducible mixture may be compacted as the channel openings are formed, such as mounds formed in situ above the hearth. In this embodiment, the channel openings may be filled with a fill material that includes at least carbonaceous material.

The layer of reducible mixture 46 may have a thickness between about 0.25 inches (6.35 mm) and 2.0 inches (50.8 mm), or more as desired. In some embodiments, the reducible mixture 46 may have a thickness of less than 1 inch (25.4 mm) and more than 0.5 inch (12.7 mm). In other embodiments, the reducible mixture 46 may have a thickness of about 0.5 inches or less (12.7 mm or less). For example, an embodiment of a briquette may have a dimension of 1.33 inches by 0.84 inches by 0.56 inches. Such briquettes would have a major dimension of 1.33 inches and a minor dimension of 0.56 inches. In another embodiment, a briquette may have a dimension of 1.38 inches by 0.88 inches by 0.48 inches. Such briquettes would have a major dimension of 1.38 inches and a minor dimension of 0.48 inches. The thickness of the reducible mixture or minor dimension of briquette may be determined by the effective heat penetration therein. Increased surface area of iron bearing material and carbonaceous material in the reducible mixture allows for improved heat transfer and reduction activity.

With reference to FIG. 1, as shown in block 22, a layer containing coarse carbonaceous material 48 may be provided over the reducible mixture 46. The coarse carbonaceous overlayer 48 typically has an average particle size greater than an average particle size of the hearth layer. The overlayer of coarse carbonaceous material may include discrete particles having a size greater than about 6 mesh. Alternatively, coarse carbonaceous overlayer 48 may include particle size greater than about 4 mesh, and may include discrete particles with a size up to about ½ inch (about 12.7 mm) or greater as desired. There may be of course some discrete particles less than 4 mesh or 6 mesh in size when discrete particles greater than 4 mesh or 6 mesh size are desired, but the majority of the discrete particles will be greater than the desired particle size. The coarse carbonaceous material may be coke, coal, char, or a combination of one or more of these.

The formed agglomerates of reducible mixture 46, and optionally the carbonaceous overlayer 48, are provided above the hearth 40 of a hearth furnace 34 (shown in FIG. 2) to thermally reduce the reducible mixture 46 to produce metallic iron nodules. The hearth furnace 34 may include any suitable furnace regions or zones for providing the appropriate conditions (e.g., drying/heating, conversion, fusion and cooling zones) for processing the reducible mixture 46 of the agglomerates to form metallic iron nodules. For example, a linear hearth furnace, or any other furnace capable of performing the thermal treatment (block 24 of FIG. 1) of the reducible mixture 46 may be used, as discussed below.

Slag beads on hearth material layer 44 are separated from the iron nodules or attached thereto. With reference to block 28 of FIG. 1, the metallic iron nodules and slag (e.g., attached slag beads) are discharged from the hearth, and the discharged metallic nodules are then separated from the slag (block 30).

We have found that the presence of CO in the furnace atmosphere accelerated the fusion process somewhat as compared to a $N_2$ only atmosphere, and the presence of $CO_2$ in furnace atmospheres adjacent the reducible mixture 46 slowed the fusion behaviors of metallic iron nodules. A presence of $CO_2$ in furnace atmospheres during iron nodule formation starting at about 1325° C. (2417° F.), the temperature on the verge of forming fused iron nodules, has been observed to inhibit the formation of the metallic iron nodules. As shown by the plot set forth as FIG. 7, iron oxides tend to reduce to metallic iron at decreasing amounts of $CO_2$ at such temperatures. The effect of $CO_2$ became less pronounced at higher temperatures, however, and in fact, the effect became much less over 1400° C. (2552° F.) because $CO_2$ forming 2 CO at such temperature. This finding is observed mainly in the $N_2$ and CO atmosphere in the laboratory tube furnace and box furnace. Also, the presence of carbon near the hot reduced iron will allow the iron to pick up carbon in solution. This carbonizing of the iron reduces the melting point of the iron and in turn lowers the process temperature for full fusion of the metallic iron.

The process of formation of the metallic iron nodules is markedly improved by the overlayer 48 of coarse carbonaceous material. The partitioning of the sulfur in the slag of the intermediate slag/metallic nodule product is improved by lowering the sulfur levels in the metallic iron nodules without large amounts of MgO in the slag. As formed, the carbonaceous material of the coarse overlayer may contain an amount of sulfur in a range from about 0.2% to about 1.5%, and more typically, in the range of 0.5% to 0.8%. Alternatively, the metallic iron nodules may have less than 0.2% sulfur. The ratio of sulfur in the slag to sulfur in the nodules may be greater than 12, or 15 or 30.

The metallic iron nodule process 10 may be carried out by the furnace system 32 as shown generally in FIG. 2. The furnace system 32 may include a linear hearth furnace 34 comprising the hearth 40, and generally includes a charging apparatus 35 adapted to provide a hearth material layer 44 above the hearth 40, and a charging apparatus 36 adapted to provide a layer of reducible mixture 46 on at least a portion of the hearth material layer 44. The charging apparatus 35, 36 may include any apparatus suitable for providing the hearth material layer 44 and the reducible mixture 46. A controllable feed chute, a leveling device, and a feed direction apparatus may be used to place such materials above the hearth 40.

An additional charging apparatus 37 may also be used to provide the coarse carbonaceous overlayer 48 over the agglomerates, which may also partially fill areas surrounding the agglomerates.

Referring to FIG. 3, the linear hearth furnace 34 for producing metallic iron material directly from iron ore and other iron oxide sources is shown. The furnace 34 is lined with a refractory or other material suitable to withstand the temperatures involved in the metallic reduction process carried out in the furnace. The hearth furnace 34 is divided into a drying/heating zone 52 capable of providing a drying/preheating atmosphere for reducible mixture 46, a conversion zone 54 capable of providing a reducing atmosphere for reducible mixture 46, a fusion zone 56 capable of providing an atmosphere to at least partially form metallic iron material, and optionally a cooling zone 58 capable of providing a cooling atmosphere for reduced material containing metallic iron material. The conversion zone 54 is positioned between the drying/preheat zone 52 and the fusion zone 56. The conversion zone 54 is the zone in which volatiles from the reducible mixture 46, including carbonaceous material, is fluidized, as well as the zone in which at least the initial reduction of metallic iron material occurs.

The hearth 40 provided within the furnace may comprise a series of movable hearth cars 42 positioned contiguously end to end as they convey the reducible mixture 46 and carbonaceous material through the furnace 34. The hearth cars 42 are moved on wheels that typically engage rails or other suitable guides. The upper portion of the hearth cars 42 are lined with a refractory material suitable to withstand the temperatures for reduction of the iron oxide bearing material into metallic iron as explained herein. The hearth cars are positioned contiguously end to end to move through the furnace 34, such that the lower portions of the hearth cars are shielded from the heat generated in the furnace. Alternatively, the hearth 40 may be movement belt or other suitable conveyance medium that with the refractory material described below, is able to withstand the temperatures of the furnace atmospheres as described below and convey the reducible mixture 46 through the furnace 34.

The hearth furnace 34 may be linear as generally illustrated in FIG. 3. It is contemplated, however, that the building in which the furnace is housed or other considerations may require that certain parts of the furnace be arcuate or at angles, to accommodate these needs. For these purposes, the hearth furnace is classified as linear if a part of its length, usually the conversion zone 54, is substantially linear in the direction of travel of the hearth 40. The hearth furnace may also be rotary, in which case the hearth cars are pie-shaped or in the form of replaceable sections of a contiguous hearth.

The zones of the furnace 34 are generally characterized by the temperature reached in each zone. In the drying/preheat zone, moisture is generally driven off from the materials on the hearth, and the reducible mixture 46 is heated to a temperature short of fluidizing volatiles in and associated with the reducible material positioned on the hearth cars 42. The design is to reach in the drying/preheat atmosphere a cut-off temperature in the reducible mixture 46 just short of significant volatilization of carbonaceous material in and associated with the reducible material. This temperature is generally somewhere in the range of about 300-600° F. (150-315° C.), depending in part on the particular composition of the reducible mixture 46.

The conversion zone 54 is characterized by heating the reducible mixture 46 first to drive off remaining the moisture and most of the volatiles in the reducible mixture, and then to initiate the reduction process in forming the reducible mixture 46 into metallic iron material and slag. The conversion zone 54 is generally characterized by heating the reducible mixture 46 to about 1500 to 2100° F. (815 to 1150° C.) depending on the particular composition and form of reducible material.

The fusion zone 56 involves further heating the reducible mixture 46, now absent of most volatile materials and commencing to form metallic iron, to fuse the metallic iron material and separate slag. The fusion zone generally involves heating the reducible mixture 46 to about 2450 to 2550° F. (about 1345-1400° C.), or higher, so that metallic iron nodules are formed with only a low percentage of iron oxide in the metallic iron. If the process is carried out efficiently, there will also be a low percentage of iron oxide in the slag, since the process is designed to reduce very high percentage of the iron oxide in the reducible material to metallic iron.

The heating of the reducible mixture 46 in the conversion zone 54 and fusion zone 56 may be done by oxy-fuel burners 60 in the side wall of the furnace housing as shown in FIG. 3. The oxy-fuel burners 60 are positioned to provide for efficient combustion of the volatilized materials in the conversion zone (as described in detail below) and to efficiently reduce the reducible material to metallic iron material in fusion zone 56. The oxy-fuel burners may be, for example, positioned about 10 foot apart (about 3 m), and may by staggered along opposite side walls, about 1 foot down from the roof along the furnace housing. Alternatively, or in addition, the oxy-fuel burners may be positioned opposite each other in the side walls and/or in the roof of the furnace 34. In addition, oxygen lances 62 may be provided capable of injecting oxygen into the conversion zone 54 and the fusion zone 56 to provide additional energy for generation of heat and efficient conversion of the reducible material in the furnace.

Cooling zone 58 cools the metallic iron material from its formation temperature in the conversion zone 54 and fusion zone 56 to a temperature at which the metallic iron material can be reasonably handled and further processed. This temperature is generally about 500° F. (260° C.) or below. The cooling can be achieved by injection of nitrogen, carbon monoxide, methane, flue gas or other cooling gas through nozzles 64 in the roofs and/or side walls of the furnace housing. Also, water spray may be used for the cooling in the cooling zone 58, if desired and provision made for water handling within the system.

A baffle or partition 66 may be provided between zones, as shown in FIG. 3. The baffles 66 may be positioned capable of inhibiting fluid communication between the atmospheres of adjacent zones, and permitting the hearth to pass beneath the baffle 66.

Further as shown in FIG. 2, the furnace system 32 includes a discharge apparatus 38 used to remove the metallic nodules and the slag formed during processing by the furnace system 32, and discharge such components (e.g., metallic iron nodules and slag) from the system 32 after the metallic iron nodules are cooled and solidified. The discharge apparatus 38 may include any number of various discharge techniques including gravity-type discharge (e.g., tilting of a tray including the nodules and slag) or techniques using a screw discharge device, magnetic device, or a rake discharge device. One will recognize that any number of different types of discharge apparatus 38 may be suitable for providing such discharge of the nodules (e.g., iron nodule and slag bead aggregates). Further, a separation apparatus may then be used to separate the metallic iron nodules from the slag beads. Any method of breaking and separating the iron nodule and slag bead aggregates may be used, e.g., tumbling in a drum, screening, or a hammer mill. However, any suitable separation apparatus may be used (e.g., a magnetic separation apparatus).

In the absence of any other information of the furnace gas composition of iron nodule processes, most of the laboratory tests in a box furnace described herein were carried out in an atmosphere of 90% N2 and 10% CO (18 L/min and 2 L/min, respectively), assuming that $CO_2$ in a natural gas-fired burner gas would be converted rapidly to CO in the presence of carbonaceous reductants and hearth layer materials by the Boudouard (i.e., carbon solution) reaction ($CO_2+C=2CO$) at temperatures higher than 1000° C., and a CO-rich atmosphere would prevail at least in the vicinity of the reducible mixture 46 largely by reason of the presence of the coarse overlayer. In these tests, carbon dioxide often predominated and could reach levels of over 16%. The use of the coarse carbonaceous overlayer, however, enabled production of metallic iron nodules even under these adverse conditions.

One or more different reducing furnaces may be used according to the disclosed processes depending on the particular application. For example, laboratory furnaces have been used to perform the thermal treatment. The laboratory furnace may use sample trays or pallets, such as 30 inch square refractory lined pallets with a flat bottom. Alternatively, a linear hearth furnace such as that is described in U.S. Pat. No. 7,413,592, entitled "Linear hearth furnace system and methods regarding same," may also be used.

The above described furnace systems are given to further illustrate the nodule formation process 10, and has provided certain aspects in testing and the results reported herein. However, any suitable furnace system capable of carrying out one or more embodiments of a metallic iron nodule formation process using mill scale or mixture with mill scale described herein may be used.

In certain furnaces (e.g., such as natural gas fired furnaces with high $CO_2$ and highly turbulent gas atmospheres), added carbonaceous material (e.g., coal) in feed mixtures (e.g., such as those reducible mixtures described herein) is lost by the carbon solution (Boudouard) reaction in certain zones of the furnace (e.g., pre-heating and conversion zones). To compensate for this loss, it may be necessary to add reducing material (e.g., carbonaceous material) up to or in excess of the stoichiometric amount theoretically necessary for complete metallization. However, such an addition of reducing material (e.g., coal) may lead to formation of larger amounts of micro metallic iron nodules, i.e., nodules that are too large to pass through a 20 mesh screen (+20 mesh material) and less than about ⅛" (about 3 mm). We have found such micro-nodule formation related to the gas turbulence and its composition in the furnace atmosphere in an area near the reducible mixture during processing.

As stated above, certain reducible mixtures with mill scale or mixtures of mill scale with similar metallurgical waste material may include a predetermined quantity of reducing material (e.g., carbonaceous reductant) between about 80 percent and about 110 percent of the stoichiometric amount necessary for complete metallization thereof. As seen in FIGS. 11 and 19A, the addition of about 85% to about 105% of the theoretical amount minimized the formation of micro-nodules. Carbon needed for further reduction and carbonizing molten metal came from, for example, CO in the furnace atmosphere from oxidization of the carbonaceous material of the coarse carbonaceous overlying layer 48 and underlying carbonaceous hearth material layer 44. The present carbon levels in the reducible mixtures are believed to assist in controlling the nucleation sites and inhibiting formation of small metallic nodules that do not consolidate in larger nodules. The stoichiometric requirements in carbon for complete reduction of the iron in the metallic nodules are satisfied from the carbon in the hearth layer and the overlayer. These sources are believed to also provide the additional carbon needed for dissolved carbon in the iron phase of the metallic iron nodules. The availability of carbon from the hearth layer and overlayer for solubilization into the reduced iron lowers its melting point, and in turn reduces the processing temperature needed for metal/slag separation.

In addition, the control of the amount of reducing material in the reducible mixture based on the stoichiometric amount theoretically necessary to complete the metallization process, applies not only to the methods described with reference to FIG. 1, but also to other direct reduction processes for forming metallic nodules. The coarse overlayer together with the underlying hearth layer described herein reduces the formation of micro-nodules formed in the reduction process.

As described previously with reference to FIG. 1, the reducible mixture 46 for use in the metallic iron nodule process 10 may include one or more additives in combination with the reducing material and the reducible iron-bearing material (e.g., reducible iron oxide material) formed of mill scale or a mixture with mill scale as described herein. One such method 200 for providing the reducible mixture 46 with optional additives is shown in the block diagram of FIG. 6. A mixture of at least reducing material of carbonaceous material such as coal, coke or charcoal and reducible iron oxide material is provided (block 202). Optionally in addition, calcium oxide or one or more compounds capable of producing calcium oxide upon thermal decomposition thereof (block 204) may be added to the reducible mixture to provide a desired $CaO/SiO_2$ ratio. Further, in addition or alternatively, sodium oxide or one or more compounds producing sodium oxide upon thermal decomposition may be provided (block 206), in combination with the other components of the reducible mixture. Also, one or more fluxing agents may optionally may be provided for use in the reducible mixture (block 208). The fluxing agents that may be provided for use with the reducible mixture (block 208) may include any suitable fluxing agent. For example, an agent that assists in the fusion process by lowering the fusion temperature of the reducible mixture or increases the fluidity of the reducible mixture may be included. In any case, silica is provided from iron-bearing material, carbonaceous material and/or by further additions to obtain a desired silica content in the reducible mixture 46. The silica content in the reducible mixture is between 0.8 and 8% by weight, and with a ratio of $CaO/SiO2$ between 1.4 and 1.8. The additives may be naturally part of the reducible iron bearing material used as a source for the iron oxide, and typically may be 2% of the content of the reducible iron bearing material but may range from about 1% to about 7% by weight. In some embodiments, calcium fluoride ($CaF_2$) or fluorspar (e.g., a mineral form of $CaF_2$) may be used as the fluxing agent. Alternatively, $SiO_2$, borax, NaF, soda ash ($Na_2CO_3$), or aluminum smelting industry slag or cryolite, may be used as the fluxing agent. With respect to the use of fluorspar as the fluxing agent, about 0.5% to about 4% by weight of the reducible mixture may be fluorspar.

Use of fluorspar, for example, as well as one or more other fluxing agents, lowers the fusion temperature of the slag phase during formation of the metallic iron nodules, and at the same time reduces the generation of micro-nodules. Fluorspar has been found to lower not only the nodule formation temperature, but also to be effective in decreasing the amount of micro-nodules generated.

It is common practice in the steel industry to increase the basicity of slag by adding lime to slag under a reducing atmosphere for removing sulfur from metallic iron, for example, in blast furnaces. However, increasing lime may lower sulfur but increase the fusion temperature and the amount of micro-nodules generated. In the present process, the use of fluxing additives that lower the slag fusion temperature, such as fluorspar, may be used to (i) lower the temperature of iron nodule formation, (ii) decrease sulfur in the iron nodules, and, (iii) decrease the amount of micro-nodules formed in processing. For example, addition of certain additives, such as fluorspar to the feed mixture may reduce the amount of micro-nodules produced during processing of the reducible feed mixture.

Although fluorspar is reported to be a not particularly effective desulfurizer in steelmaking slag, we have found that sulfur in iron nodules was found to be lowered with increasing fluorspar addition in our methods as described herein. Therefore, the use of fluorspar not only lowered the operating temperature and further lowered the sulfur in iron nodules, but also has also been found to have the unexpected benefit of minimizing the generation of micro-nodules with the metallic iron nodules. It is believed that the melting temperature for the slag components is lower when fluorspar is employed. An increased amount of liquid slag is thus available to interact with the sulfur and capture the sulfur within the slag. If lime is present as an additive, the slag volume is increased and the fluorspar is more effective in increasing sulfur levels in the slag and decreasing sulfur levels in the metallic iron nodules.

Figure 6:
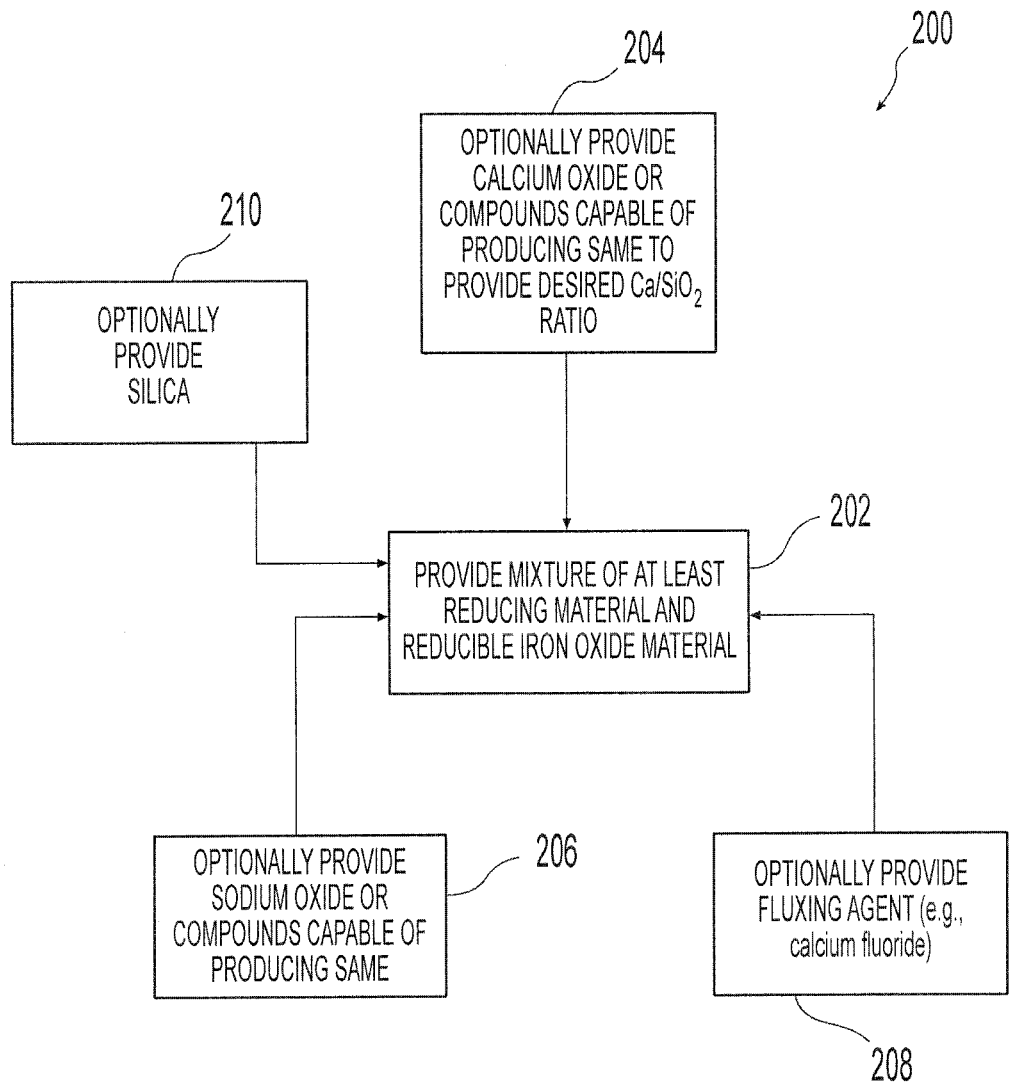
FIG. 6 shows a block diagram of an exemplary embodiment of the present method for use in reducing metallic iron nodules from mill scale as shown generally in FIG. 1.

With reference to FIG. 6, calcium oxide, and/or one or more compounds capable of producing calcium oxide upon thermal decomposition may also be used (block 204). For example, lime may be used as an additive to the reducible mixture. Increased use of lime decreased sulfur in iron nodules in one experiment from 0.084% to 0.05%. Increased use of lime, however, requires increasingly higher reduction temperatures and longer time at reduction temperature for forming fully fused metallic iron nodules. As such, a substantial amount of lime is not desirable, as higher temperatures also result in less economical production of metallic iron nodules, and reduces yields with increased formation of micro-nodules. Yet, further decreases in sulfur content may be accomplished by use of the coarse overlayer of carbonaceous material as explained herein.

Also shown in FIG. 6, sodium oxide, and/or one or more compounds capable of producing sodium oxide upon thermal decomposition, may be used in addition to lime (block 206) to lower sulfur in the formed metallic iron nodules. Soda ash, $Na_2CO_3$, $NaHCO_3$, NaOH, borax, NaF and/or aluminum smelting industry slag, may be used to lower sulfur in the metallic iron nodules (e.g., used in the reducible mixture).

Figure 7:
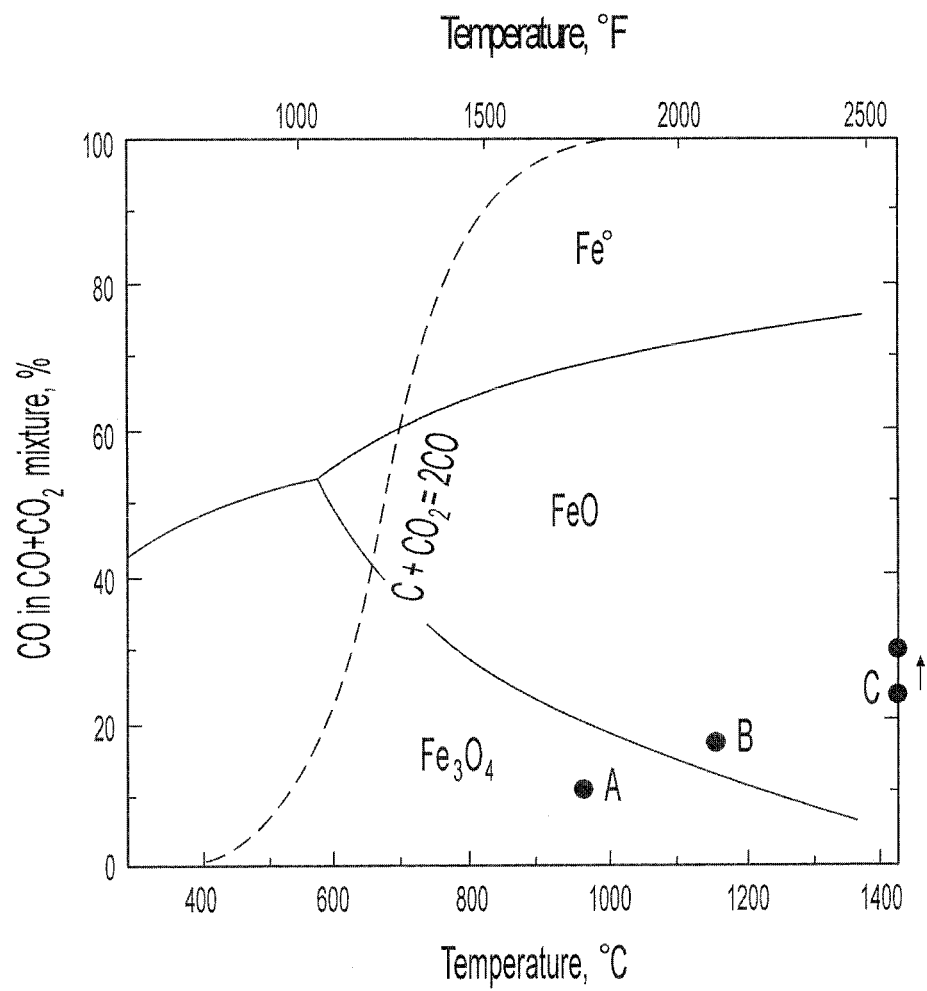
FIG. 7 is a graph showing iron oxide reduction for varying concentrations of CO and temperatures for use in making metallic iron nodules by the present method from mill scale.

Concentrations of CO, expressed as percentages of the $CO+CO_2$ mixtures in the atmosphere, were plotted in the equilibrium concentration diagrams of iron oxide reduction and carbon solution (Boudouard) reactions as shown in FIG. 7. The CO concentration in Zone 1 (identified as "A" in FIG. 7, 1750° F. (954° C.)) was in the stability region of $Fe_3O_4$, and those in Zones 2 ("B," 2100° F. (1149° C.)) and Zone 3 ("C,"

2600° F. (1427° C.)) were in the low range of the stability region of FeO. All the points were well below the carbon solution reaction, supporting a view that added coal was rapidly lost in the linear hearth furnace. The gas sampling ports of the linear hearth furnace were located on the furnace wall at about 8 inches above the refractory pallet surfaces. Because of the high turbulence of furnace gases, the CO concentrations of 4% should represent a well mixed value. The arrow at 2600° F. (1427° F.) in FIG. 7 indicates the increase in CO with time in Zone 3.

Samples of mill scale were taken from three Nucor Steel mills as shown in FIG. 8. The total iron in the sample from Nucor Steel Arkansas (NSAR) was 71.95% and having an FeO equivalent of about 18.6% therein. The total iron in the sample from Nucor Steel Decatur (NSDE) was 74.44% and having an FeO equivalent of about 8% therein. The total iron in the sample from Nucor-Yamata (NYS) was 70.69% and having an FeO equivalent of about 43.1% therein. The size distribution of the mill scale is shown in FIG. 9.

Metallic iron nodules were produced using the mill scale in mixture with varying amounts of EAF slag. As shown in FIG. 10, increasing the amount of EAF slag increased the formation of micro-nodules. Additionally, briquettes were formed using the NSAR mill scale and PRB coal as shown in FIG. 11. Metallic iron nodules were produced with substantially no micro metallic iron nodules, as shown in FIG. 11. The amount of sulfur in the metallic iron nodules decreased with increasing amount of coal in the briquettes.

Other metallurgical wastes have been investigated to mix with mill scale in producing metallic iron nodules by the present method. An iron-bearing waste product sold by Horsehead Corporation was tested, Horsehead IRM. Horsehead utilizes a Waelz kiln to process EAF dust and other waste. In addition, iron-bearing material from Steel Dust Recycling, LLC (SDR) was also analyzed. The analysis of these various metallurgical wastes is shown in FIGS. 12 and 13. Preliminary testing of mixtures of mill scale and Horsehead IRM is shown in FIG. 14. Certain mixtures shown in FIG. 14 do not fall within the scope of the present method, but are identified as comparative examples.

In recent experiments producing iron nodules in the laboratory box furnace, mill scale was reduced to form metallic iron nodules using Elkhorn coal as the reducing material, as shown in FIGS. 15 through 19. In this experiment, the briquettes were placed over an anthracite hearth layer in a graphite tray and heated in the box furnace to determine the time to fusion at 1400° C. (2552° F.), the amount of coal addition from their fusion time, and amount of sulfur in the resulting iron nodules. Additional tests were performed to investigate the effect of holding the samples at 1400° C. (2552° F.) for 20 minutes on carbon and sulfur content in the nodules. FIG. 19A shows the time to fusion and the weight distributions of products at fusion time and after 20 minutes. As shown in FIG. 19A, fusion time decreased and the amount of micro-nodules increased with increasing coal addition. When the amount of coal was 105% of the stoichiometric amount needed to reduce the iron-bearing material in the briquette, the amount of micro-nodules became notably higher.

The analytical results of products are shown in FIG. 19B. The carbon analyses of 2.2-2.5% Carbon at fusion time correspond to a melting temperature of iron of about 1300° C. (2372° F.), as estimated from the liquidus curve of the iron-carbon phase diagram. Carbon analyses of the 20-minute samples show that carbon amount in the nodules increased with increasing coal addition. The amount of sulfur in the iron nodules, however, decreased with increasing coal addition and with increased time at temperature. In this alternative, we have found the amount of coal in the reducible mixture to be between about 95 and 100% stoichiometric when no binder was used to reduce micro-nodules generation and amount of sulfur in the iron nodules.

Figures 20, 21:
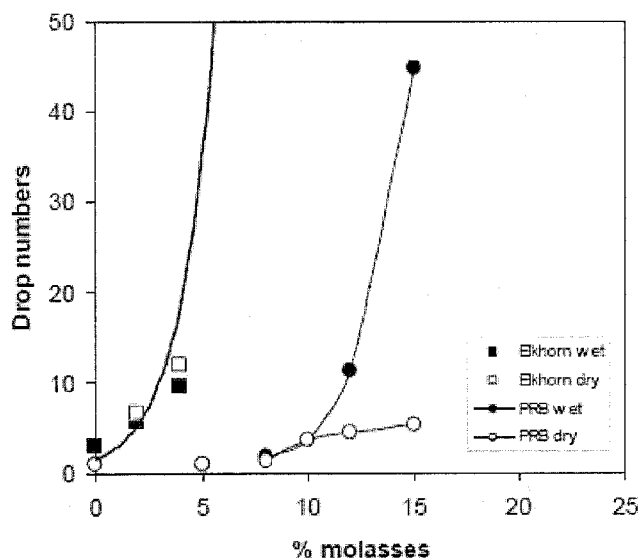
FIG. 20 is a table showing drop test results for briquettes prepared from reducible mixtures with increasing amount of molasses binder for use in the presents method.
FIG. 21 is a graph showing drop test results and the effect of increasing binder in briquettes for Elkhorn and PRB coal wet and dry.

Tests were performed to determine the briquette strength of reducible mixtures of mill scale and Elkhorn coal both without a binder and with molasses binder, shown in FIGS. 18, 20, and 21 for purposes of best mode. As shown in FIGS. 18, 20, and 21, even in the absence of any binders, the briquettes with Elkhorn coal withstood some 18" drops, the number of drops appearing to decrease somewhat with increasing coal addition. This is in contrast to using PRB coal briquettes, which we have found typically will not survive one drop for both wet and dry briquettes without a binder. The Elkhorn coal briquettes became weaker upon drying, but did not appear correlated with the amount of coal.

Figures 22, 23:
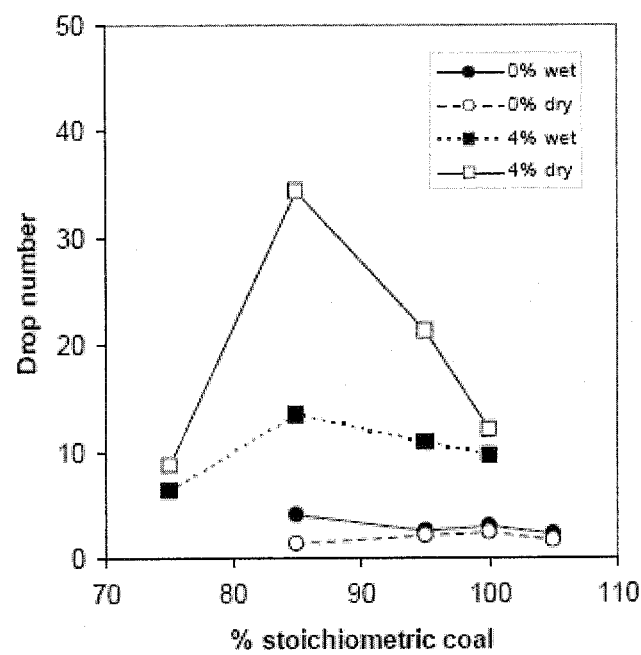
FIG. 22 is a table showing the with different stoichiometric amounts of Elkhorn coal, hydrated lime and fluorspar formed into briquettes for use in the present method composition.
FIG. 23 is a graph showing drop test results with different stoichiometric amounts of Elkhorn coal formed into briquettes for use in the present method.
Figure 26:
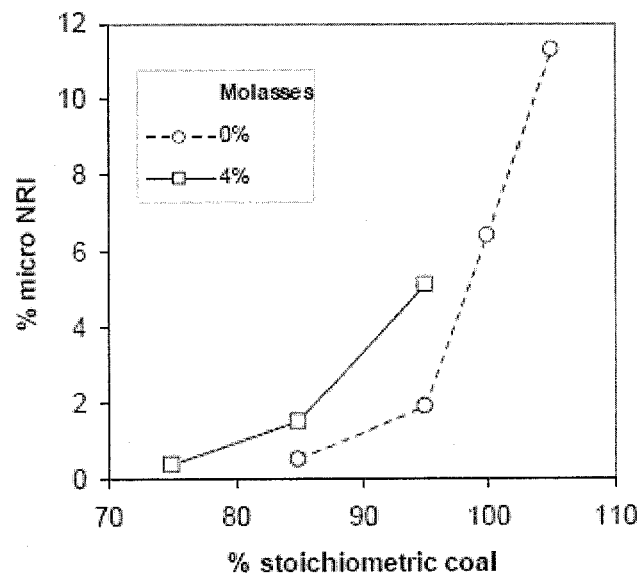
FIG. 26 is a graph showing amount of micro metallic iron nodules with different stoichiometric amounts of Elkhorn coal addition and of molasses binder used in the present method.
Figure 27:
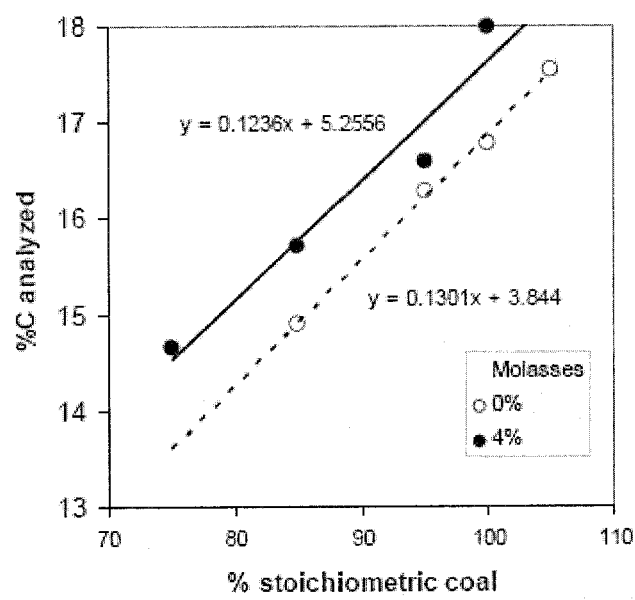
FIG. 27 is a graph showing percent carbon with different stoichiometric amounts of Elkhorn coal addition and of molasses binder used in the present method.

The role that molasses plays in generating micro-nodules was investigated by using feed mixtures with different amounts of Elkhorn coal in the presence of 4% molasses binder. The composition of feed mixtures is shown in FIG. 22. In FIG. 24A, the amount of micro-nodules is seen to increase with increasing additions of coal. However, we have found that the increase in the amount of micro-nodules was not as great as if coal were used without binder (see FIGS. 25, 19A, and 24A). The amounts of micro-nodules generated are plotted in FIG. 26, showing more micro-nodules generated when using molasses as a binder. Additionally, the amount of carbon in the metallic iron nodules increased when using molasses, as shown in FIG. 27. Additionally, as shown in FIG. 28, with increasing addition of molasses, the amount of carbon in the nodules increased and amount of sulfur in the nodules decreased.

This invention has been described with reference to illustrative embodiments and is not meant to be construed in a limiting sense. It will be apparent to one skilled in the art that elements or process steps from one or more embodiments described herein may be used in combination with elements or process steps from one or more other embodiments described herein, and that the present invention is not limited to the specific embodiments provided herein but only as set forth in the accompanying claims. Various modifications of the illustrative embodiments, as well as additional embodiments to the invention will be apparent to persons skilled in the art upon reference to this description.

What is claimed is:

1. A method of recovering metallic iron from iron-bearing metallurgical waste in steelmaking comprising the steps of:
   (a) providing an iron-bearing metallurgical waste containing more than 55% by weight FeO and FeO equivalent and a particle size of at least 80% less than 10 mesh,
   (b) mixing the iron-bearing metallurgical waste with a carbonaceous material to form a reducible mixture where the carbonaceous material is between 80 and 110% of the stoichiometric amount needed to reduce the iron-bearing waste to metallic iron, and further providing the reducible mixture with a ratio of $CaO/SiO_2$ between 1.4 and 1.8 and a silica content controlled to between 0.8 and 8% by weight.

2. The method of recovering metallic iron from iron-bearing metallurgical waste in steelmaking as claimed in claim 1 where the carbonaceous material is between 85 and 100% of the stoichiometric amount needed to reduce the iron-bearing waste to metallic iron.

3. The method of recovering metallic iron from iron-bearing metallurgical waste in steelmaking as claimed in claim 1, the iron-bearing metallurgical waste comprising mill scale.

4. The method of recovering metallic iron from iron-bearing metallurgical waste in steelmaking as claimed in claim 1, the iron-bearing metallurgical waste comprising a mixture of mill scale and one selected from the group of direct reduced iron fines, processed electric arc furnace dust, basic oxygen furnace sludge, blast furnace dust, wash ore tailings, red ore tailings, and mixtures thereof.

5. The method of recovering metallic iron from iron-bearing metallurgical waste in steelmaking as claimed in claim 1 where the silica content is at least in part from the iron-bearing metallurgical waste.

6. The method of recovering metallic iron from iron-bearing metallurgical waste in steelmaking as claimed in claim 1 where the silica content is at least partially selected from the group consisting of sand, electric arc furnace slag, ladle metallurgy furnace slag, basic oxygen furnace slag, fly ash, taconite tailings, wash ore tailings, floatation tailings, direct reduced iron fines, blast furnace slag, and mixtures thereof.

7. The method of recovering metallic iron from iron-bearing metallurgical waste in steelmaking as claimed in claim 6 further comprising the additional step after forming the agglomerates and before heating the agglomerates of providing an overlayer of coarse carbonaceous material of between 6 mesh and 1 inch over the agglomerates.

8. The method of recovering metallic iron from iron-bearing metallurgical waste created in steelmaking as claimed in claim 7 where the coverage of the overlayer of coarse carbonaceous material is between about 0.5 lb/ft$^2$ (2.44 kg/m$^2$) and about 1.25 lb/ft$^2$ (6.10 kg/m$^2$).

9. The method of recovering metallic iron from iron-bearing metallurgical waste in steelmaking as claimed in claim 6 further comprising the additional step after forming the agglomerates and before heating the agglomerates of providing an overlayer of coarse carbonaceous material of between 6 mesh and ⅝ inch over the agglomerates.

10. The method of recovering metallic iron from iron-bearing metallurgical waste created in steelmaking as claimed in claim 9 where the coverage of the overlayer of coarse carbonaceous material is between about 0.5 lb/ft$^2$ (2.44 kg/m$^2$) and about 1.25 lb/ft$^2$ (6.10 kg/m$^2$).

11. The method of recovering metallic iron from iron-bearing metallurgical waste in steelmaking as claimed in claim 1 further comprising the step of reducing particle size of iron-bearing metallurgical waste to at least 80% less than 14 mesh.

12. The method of recovering metallic iron from iron-bearing metallurgical waste in steelmaking as claimed in claim 1 where the iron-bearing metallurgical waste is provided of at least 80% less than 14 mesh.

13. The method of recovering metallic iron from iron-bearing metallurgical waste in steelmaking as claimed in claim 12 where the iron-bearing metallurgical waste mixed with a combination of high volatile sub-bituminous coal and low volatile carbonaceous material selected from the group consisting of anthracite, bituminous coal, coke breeze, coke, and char as the carbonaceous material.

14. The method of recovering metallic iron from iron-bearing metallurgical waste in steelmaking as claimed in claim 12 where the step of forming the agglomerates on the hearth involves first forming agglomerates of the reducible mixture and then placing the agglomerates on the hearth material layer.

15. The method of recovering metallic iron from iron-bearing metallurgical waste in steelmaking as claimed in claim 1 where iron-bearing metallurgical waste is mixed with less than 8% by weight lime and less than 4% by weight fluorspar.

16. The method of recovering metallic iron from iron-bearing metallurgical waste in steelmaking as claimed in claim 1 where the hearth material layer is a carbonaceous material selected from the group consisting of sub-bituminous coal/char, bituminous coal, anthracite and coke of more than 80% between 100 mesh and 3 mesh.

17. The method of recovering metallic iron from iron-bearing metallurgical waste in steelmaking as claimed in claim 1 where heating the agglomerates comprises heating the agglomerates to greater than 2450° F.

18. The method of recovering metallic iron from iron-bearing metallurgical waste in steelmaking as claimed in claim 1 further comprising the additional step after forming the agglomerates and before heating the agglomerates of providing an overlayer of coarse carbonaceous material of between 6 mesh and 1 inch over the agglomerates.

19. The method of recovering metallic iron from iron-bearing metallurgical waste in steelmaking as claimed in claim 18 where the coverage of the overlayer of coarse carbonaceous material is between about 0.5 lb/ft$^2$ (2.44 kg/m$^2$) and about 1.25 lb/ft$^2$ (6.10 kg/m$^2$).

20. The method of recovering metallic iron from iron-bearing metallurgical waste in steelmaking as claimed in claim 1 where the iron-bearing metallurgical waste is mixed with a combination of high volatile sub-bituminous coal and low volatile carbonaceous material selected from the group consisting of anthracite, bituminous coal, coke breeze, coke, and char as the carbonaceous material.

21. The method of recovering metallic iron from iron-bearing metallurgical waste in steelmaking as claimed in claim 1 where the step of forming the agglomerates on the hearth involves first forming agglomerates of the reducible mixture and then placing the agglomerates on the hearth material layer.

* * * * *

UNITED STATES PATENT AND TRADEMARK OFFICE
CERTIFICATE OF CORRECTION

PATENT NO. : 8,535,411 B2  
APPLICATION NO. : 13/187937  
DATED : September 17, 2013  
INVENTOR(S) : David W. Hendrickson and Iwao Iwasaki It is certified that error appears in the above-identified patent and that said Letters Patent is hereby corrected as shown below:

In the Specification:
Column 1, lines 13-17
delete "The present invention was made with support by the Economic Development Administration, Grant No. 06-69-04501, and the Department of Energy, Sponsor Award DE-FG36-05GO15185. The United States government has certain rights in the invention."
insert -- This invention was made with government support under 06-69-04501 awarded by the Economic Development Administration and DE-FG36-05GO15185 awarded by the Dept. of Energy. The government has certain rights in the invention. --

Signed and Sealed this
Eighteenth Day of February, 2014

Michelle K. Lee
*Deputy Director of the United States Patent and Trademark Office*